United States Patent
Noguchi et al.

(10) Patent No.: US 11,061,628 B2
(45) Date of Patent: Jul. 13, 2021

(54) INFORMATION PROCESSING SYSTEM AND NON-TRANSITORY COMPUTER READABLE MEDIUM

(71) Applicant: FUJIFILM BUSINESS INNOVATION CORP., Tokyo (JP)

(72) Inventors: Daisuke Noguchi, Kanagawa (JP); Takashi Kikumoto, Kanagawa (JP); Shingo Tajima, Kanagawa (JP); Bo Liu, Kanagawa (JP); Masatake Kawabe, Kanagawa (JP); Megumi Yamaguchi, Kanagawa (JP); Shogo Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/811,304

(22) Filed: Mar. 6, 2020

(65) Prior Publication Data

US 2021/0055894 A1 Feb. 25, 2021

(30) Foreign Application Priority Data

Aug. 22, 2019 (JP) .............................. JP2019-151926

(51) Int. Cl.
*H04N 1/00* (2006.01)
*G06F 3/12* (2006.01)
*G06K 15/02* (2006.01)

(52) U.S. Cl.
CPC ............ *G06F 3/1215* (2013.01); *G06F 3/126* (2013.01); *G06K 15/022* (2013.01)

(58) Field of Classification Search
CPC .... G06F 3/1215; G06F 3/1212; G06K 15/022
See application file for complete search history.

(56) References Cited

U.S. PATENT DOCUMENTS

| 2015/0356385 | A1* | 12/2015 | Naka .................. | G06K 15/1823 358/1.15 |
| 2015/0370205 | A1* | 12/2015 | Sasami .............. | G06K 15/1805 399/38 |
| 2016/0092147 | A1* | 3/2016 | Nakamura ............ | G06F 3/1219 358/1.6 |
| 2017/0097595 | A1* | 4/2017 | Yamada ............. | G03G 15/2014 |

FOREIGN PATENT DOCUMENTS

| JP | 2014-21299 A | 2/2014 |
| JP | 2015-30228 A | 2/2015 |

* cited by examiner

*Primary Examiner* — Moustapha Diaby
(74) *Attorney, Agent, or Firm* — Oliff PLC

(57) ABSTRACT

An information processing system includes a processor that performs control, in the case where plural print jobs with different allowable values of a transport speed are consecutively scheduled on one roll of rolled paper, so as to increase and reduce the transport speed of each print job in such a range that the transport speed of the print job does not exceed the allowable value of the transport speed of the print job during execution of print operation corresponding to the print job.

12 Claims, 17 Drawing Sheets

INFORMATION PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-151926 filed Aug. 22, 2019.

BACKGROUND

(i) Technical Field

The present disclosure relates to an information processing system and a non-transitory computer readable medium.

(ii) Related Art

In an image forming apparatus (hereinafter referred to also as a "continuous feed printer") that consecutively forms images on a long band-like piece of paper, printing is started after a transport speed determined in advance is reached. A long band-like piece of paper wrapped around a reel etc. is called "rolled paper". One example of the related art is disclosed in Japanese Unexamined Patent Application Publication No. 2015-30228.

SUMMARY

It is occasionally desired to schedule a plurality of print jobs with different allowable values of the transport speed on a single roll of rolled paper. If the transport speed exceeds an allowable value of the transport speed determined for each print job, data to be printed may not be processed in time, and there may be a portion (hereinafter referred to as a "blank") in which nothing is printed. The occurrence of a blank not only wastes paper, but also increases the burden of post-processing. Thus, the smallest one of the allowable values of the plurality of print jobs is used as the transport speed for the plurality of print jobs. This inevitably results in an increase in the time needed to complete the plurality of print jobs.

Aspects of non-limiting embodiments of the present disclosure relate to reducing the time before completion of a plurality of print jobs scheduled to be printed compared to the case where the transport speed used to print the plurality of print jobs is determined in accordance with the lowest transport speed of those of the plurality of print jobs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor that performs control, in a case where a plurality of print jobs with different allowable values of a transport speed are consecutively scheduled on one roll of rolled paper, so as to increase and reduce the transport speed of each print job in such a range that the transport speed of the print job does not exceed the allowable value of the transport speed of the print job during execution of print operation corresponding to the print job.

BRIEF DESCRIPTION OF THE DRAWINGS

Exemplary embodiments of the present disclosure will be described in detail based on the following figures, wherein:

FIGS. 9A and 9B each illustrate an example of the job management screen for use to provide the image forming apparatus with an instruction for printing, in which FIG. 9A illustrates a job management screen to be displayed in the case where a variable transport speed mode is off, and FIG. 9B illustrates a job management screen to be displayed in the case where the variable transport speed mode is on;

DETAILED DESCRIPTION

Exemplary embodiments of the present disclosure will be described below with reference to the drawings.

First Exemplary Embodiment

<System Configuration>

Figure 1:
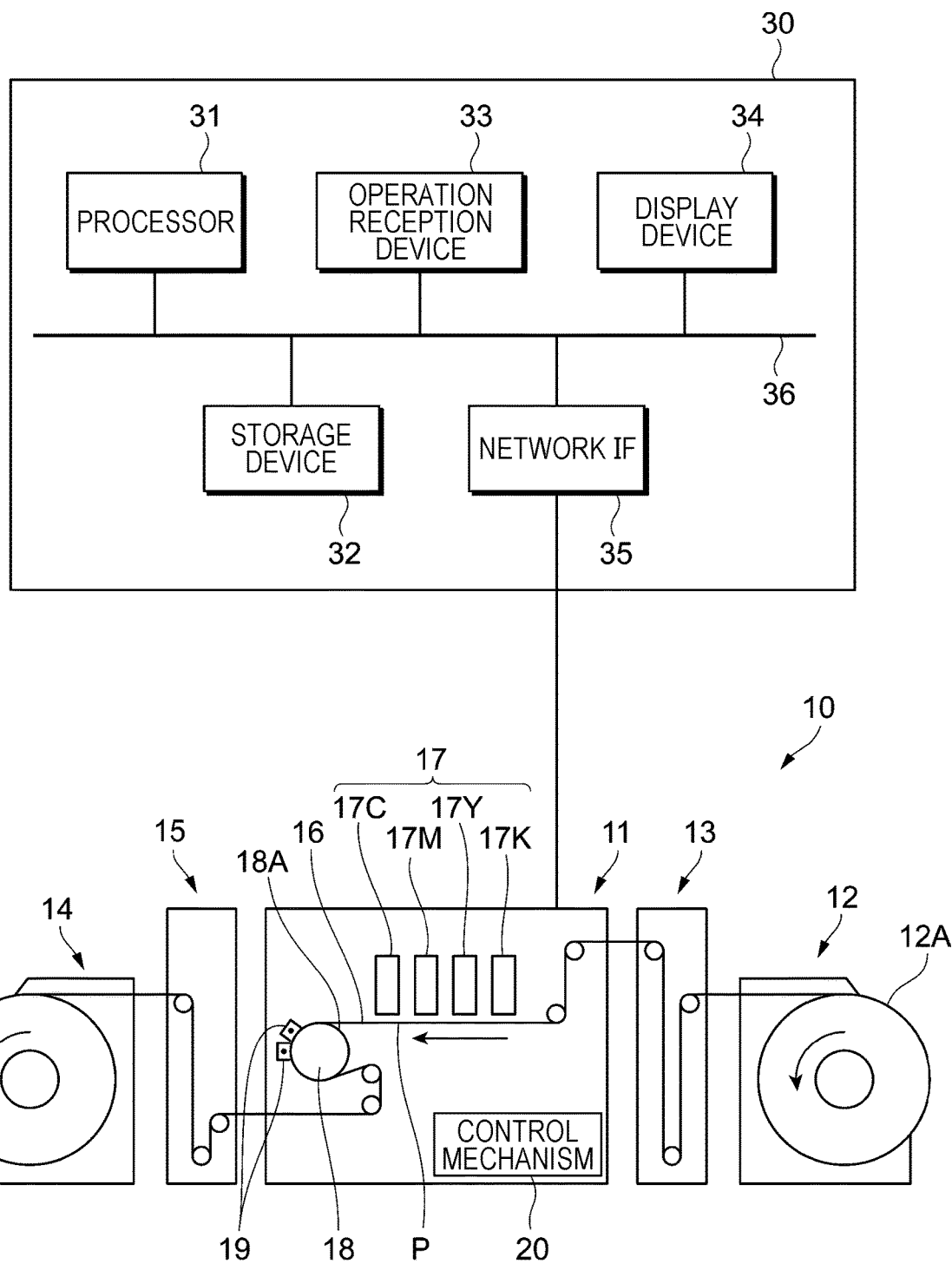
FIG. 1 schematically illustrates an example of the overall configuration of an image forming system according to a first exemplary embodiment.

FIG. 1 schematically illustrates an example of the overall configuration of an image forming system 1 according to a first exemplary embodiment.

The image forming system 1 illustrated in FIG. 1 includes an image forming apparatus 10 that forms an image on a long band-like piece of paper P (hereinafter referred to as "continuous feed paper P") drawn from rolled paper, and a management server 30 that controls the formation of an image by the image forming apparatus 10. The management server 30 is an example of an information processing system.

<Configuration of Image Forming Apparatus>

The image forming apparatus 10 illustrated in FIG. 1 includes: an image forming unit 11 that forms an image on the continuous feed paper P; a pre-processing unit 12 that houses the continuous feed paper P to be supplied to the image forming unit 11; a buffer unit 13 disposed between the image forming unit 11 and the pre-processing unit 12 to adjust the amount of transport etc. of the continuous feed paper P to be supplied from the pre-processing unit 12 to the image forming unit 11; a post-processing unit 14 that houses the continuous feed paper P ejected from the image forming unit 11; and a buffer unit 15 disposed between the image forming unit 11 and the post-processing unit 14 to adjust the amount of transport etc. of the continuous feed paper P to be ejected from the image forming unit 11 to the post-processing unit 14.

The image forming unit 11 includes a roller member that guides the continuous feed paper P along a transport path 16, and a droplet ejection device 17 that ejects droplets to the continuous feed paper P transported along the transport path 16 to form an image. In this exemplary embodiment, a so-called ink-jet system is adopted as the print method.

The droplet ejection device 17 is composed of droplet ejection heads for a plurality of colors that eject ink droplets onto the continuous feed paper P. Four droplet ejection heads, namely a droplet ejection head 17K, a droplet ejection head 17Y, a droplet ejection head 17M, and a droplet ejection head 17C, are provided. The droplet ejection head 17K is used to form an image in black color. The droplet ejection head 17Y is used to form an image in yellow color. The droplet ejection head 17M is used to form an image in magenta color. The droplet ejection head 17C is used to form an image in cyan color.

In the case of the present exemplary embodiment, the droplet ejection head 17K, the droplet ejection head 17Y, the droplet ejection head 17M, and the droplet ejection head 17C are disposed in this order from the upstream side toward the downstream side in the transport direction of the continuous feed paper P. The droplet ejection head 17K, the droplet ejection head 17Y, the droplet ejection head 17M, and the droplet ejection head 17C are disposed to face the continuous feed paper P being transported.

In the case where the colors of inks ejected from the droplet ejection heads are not differentiated from each other, the symbols K, Y, M, and C are not provided in the following description.

A drying drum 18 is disposed downstream of the droplet ejection heads 17 in the transport direction of the continuous feed paper P. The back surface of the continuous feed paper P is wrapped around an outer peripheral surface 18A of the drying drum 18. The drying drum 18 is rotated passively along with transport of the continuous feed paper P to dry an image formed on the continuous feed paper P.

Besides, halogen heaters 19 that dry the image formed on the continuous feed paper P are disposed around the drying drum 18. The halogen heaters 19 dry the image on the continuous feed paper P wrapped around the drying drum 18.

The image forming unit 11 includes a control mechanism 20 that controls operation of the various portions of the image forming apparatus 10. The control mechanism 20 includes a central processing unit (CPU), a read only memory (ROM), a random access memory (RAM), and other storage devices such as a hard disk device (none of which are illustrated). The CPU, the ROM, and the RAM constitute a computer.

A supply roller 12A is attached to the pre-processing unit 12. The continuous feed paper P to be supplied to the image forming unit 11 is wrapped around the supply roller 12a. The supply roller 12a is rotatably supported by a frame member (not illustrated).

On the other hand, a winding roller 14A is attached to the post-processing unit 14. The winding roller 14A winds the continuous feed paper P on which an image has been formed. The winding roller 14A is rotationally driven by a motor (not illustrated). When the winding roller 14A is rotated, the continuous feed paper P is drawn out from the supply roller 12A, and transported along the transport path 16. The transport speed of the continuous feed paper P is controlled by the control mechanism 20. Specifically, the control mechanism 20 controls the rotational speed of the motor (not illustrated) which rotationally drives the winding roller 14A.

In the case of the present exemplary embodiment, the speed of transport of the continuous feed paper P by the control mechanism 20 is controlled on the basis of an instruction from the management server 30. The management server 30 specifies the transport speed for each print job. The control mechanism 20 controls the rotational speed of the motor (not illustrated) so as to achieve the specified transport speed.

The image forming apparatus 10 according to the present exemplary embodiment is able to increase and reduce the transport speed of the continuous feed paper P during execution of print jobs. In the case where the transport speed of the continuous feed paper P is increased and reduced, ejection of droplets by the droplet ejection device 17 is also controlled so that the quality of an image to be printed on the continuous feed paper P is not reduced even during changes in the transport speed.

<Configuration of Management Server>

The management server 30 includes: a processor 31 that controls operation of the entire server and the image forming apparatus 10 through execution of a program; a storage device 32 that stores the program executed by the processor 31 and various kinds of data; an operation reception device 33 that receives an operation by a user; a display device 34 that displays an operation screen to be seen by the user; and a network interface (IF) 35 that achieves communication with the image forming apparatus 10. These portions are connected to each other by a signal line 36 such as a data bus, an address bus, and a peripheral component interconnect (PCI) bus.

The processor 31 is constituted of a CPU, for example. The storage device 32 is constituted from a ROM that stores a basic input output system (BIOS) etc., a RAM that is used as a work area, and a hard disk device that stores a basic program, an application program, etc., for example. The ROM and the RAM may be included in a part of the processor 31. The processor 31 and the storage device 32 constitute a computer.

The operation reception device 33 is constituted of a keyboard, a mouse, a mechanical button, or a switch, for example. The operation reception device 33 also includes a touch sensor that constitutes a touch screen together with the display device 34.

The display device 34 includes a liquid crystal display or an organic electro-luminescence (EL) display, for example. An operation screen displayed on the display device 34 enables selecting a print job to be printed and confirming the state of printing of the print job. The state of printing includes being printed and being suspended, for example.

<Functional Configuration of Management Server>

Figure 2:
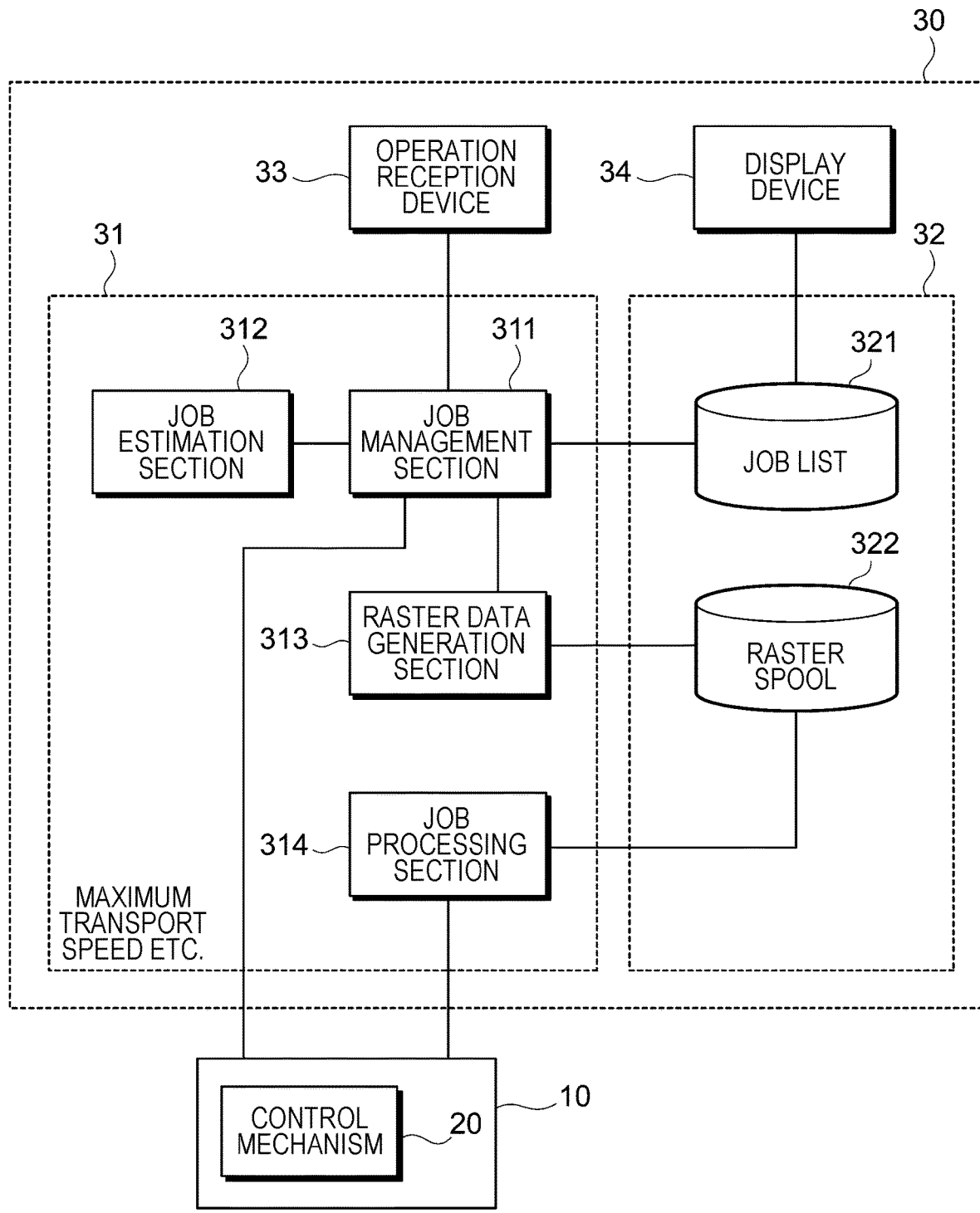
FIG. 2 illustrates an example of the functional configuration of a management server according to the first exemplary embodiment.

FIG. 2 illustrates an example of the functional configuration of the management server 30 according to the first exemplary embodiment.

FIG. 2 illustrates some of the functions implemented by the processor 31 through execution of an application program and some of data stored in the storage device 32.

The processor 31 illustrated in FIG. 2 functions as a job management section 311, a job estimation section 312, a raster data generation section 313, and a job processing section 314 through execution of an application program. The storage device 32 stores a job list 321 and a raster spool 322.

The function of the job management section 311 is implemented through execution of a program for managing print jobs input from the user.

For example, the job management section 311 executes a process of storing print jobs input from the user in the job list 321.

In addition, for example, the job management section 311 executes a process of receiving designation of a print job to be delivered to the raster data generation section 313 from the job list 321 which is a list of print jobs received as a target to be printed through the operation reception device 33.

The job management section 311 according to the present exemplary embodiment also has a function of notifying the image forming apparatus 10 of the maximum transport speed etc. of each print job, which is the result of an estimation made by the job estimation section 312, in the case where a mode in which printing is performed while varying the transport speed (hereinafter referred to also as a "variable transport speed mode").

The job estimation section 312 calculates the rasterizing performance on the basis of the content of setting for printing specified by the user, the size of document data, the file format of the document data, etc., and outputs the maximum transport speed which is determined from the rasterizing performance for each print job.

In the case of the present exemplary embodiment, the maximum transport speed determines the maximum value of the transport speed of the continuous feed paper P which is usable during execution of a print job. If the speed of transport of the continuous feed paper P by the image forming apparatus 10 exceeds the maximum transport speed of the print job being printed, there may occur a region in which no image is formed on the continuous feed paper P. Printing in which such a region occurs is also called "intermittent printing", and is a typical example of print failures.

Thus, the transport speed during execution of each print job should not exceed the maximum transport speed which is calculated by the job estimation section 312. The maximum transport speed is an example of an allowable value of the transport speed of the corresponding print job.

In the case of the present exemplary embodiment, the maximum transport speed of each print job is determined so as not to exceed the upper limit value of the transport speed that may be physically supported by the image forming apparatus 10. In the case where the continuous feed paper P is transported at the maximum transport speed, which is determined for each print job, or less, the image forming apparatus 10 according to the present exemplary embodiment is able to keep the print quality equal even if the transport speed of the continuous feed paper P is increased and decreased during printing. An application for elemental technology for implementing a variable transport speed mode has been filed by the applicant. A print quality that is equal to that during a period in which the transport speed of the continuous feed paper P is constant is obtained also during a period in which the transport speed is increased and decreased during printing.

The raster data generation section 313 rasterizes the print job which is delivered from the job management section 311, and stores prepared raster data in the raster spool 322.

The job processing section 314 sequentially outputs the raster data in the raster spool 322 to the image forming apparatus 10.

<Examples of Management Screen>

Examples of a job management screen to be displayed on the display device 34 (see FIG. 1) will be described below with reference to FIGS. 3 to 9.

Figure 3:
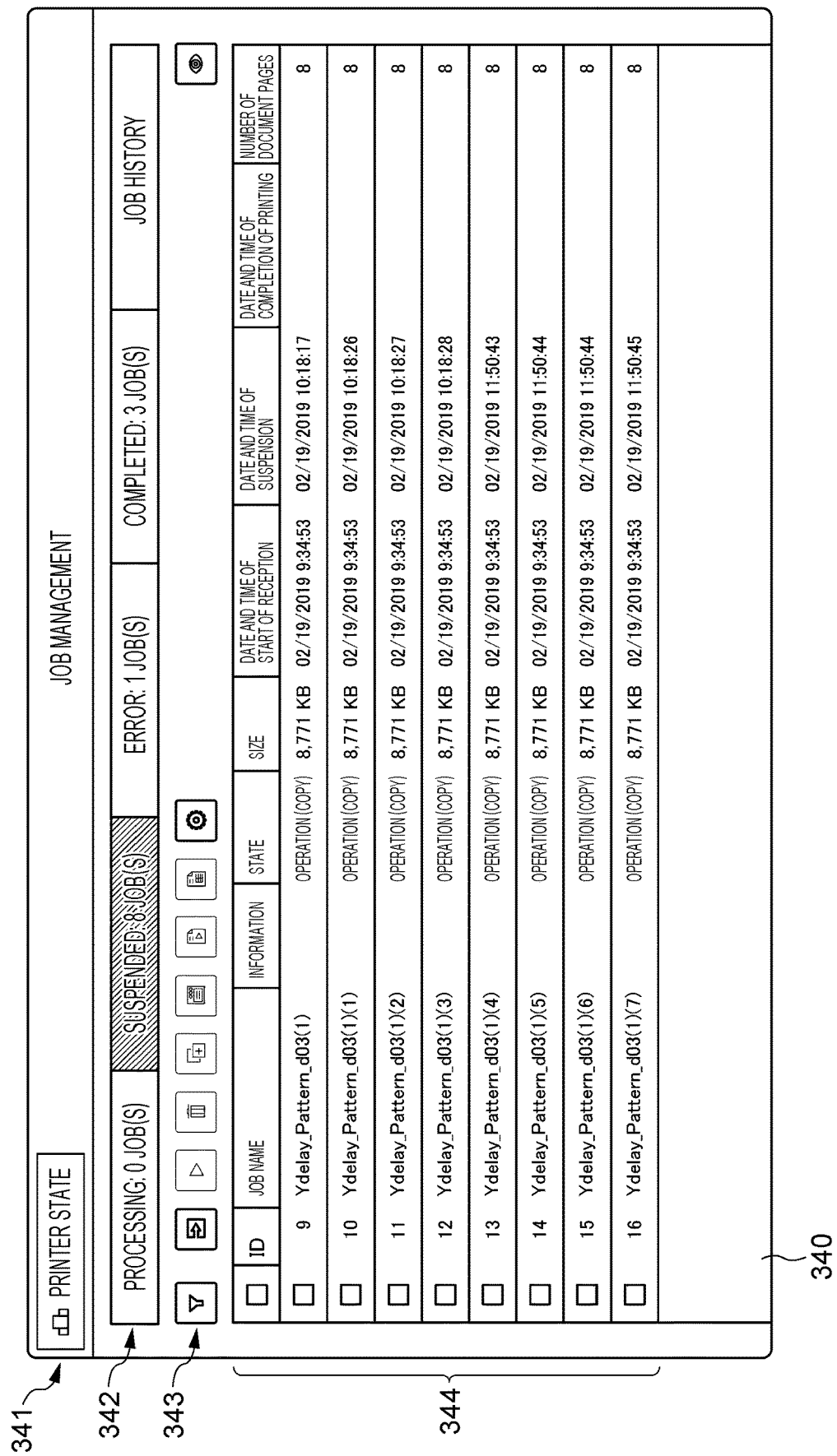
FIG. 3 illustrates an example of a job management screen to be displayed when print jobs are input.

FIG. 3 illustrates an example of a job management screen 340 to be displayed when print jobs are input. The input print jobs are held in a suspend queue.

The job management screen 340 illustrated in FIG. 3 includes a title field 341, an item field 342, an operation button field 343, and an information field 344 in which information corresponding to the item field 342 is displayed.

In the case of FIG. 3, the item field 342 includes "processing", "suspended", "error", "completed", and "job history", and only "suspended", among others, is highlighted. Highlighted display indicates the correspondence with the print jobs displayed in the information field 344. In the case of FIG. 3, the information field 344 indicates print jobs in the suspended state.

In the case of FIG. 3, the item field 342 also displays the number of print jobs corresponding to each item. In the case of FIG. 3, there are eight print jobs being suspended, one print job in the error state, and three print jobs in the completed state.

The operation button field 343 includes an array of operation buttons. In the case of FIG. 3, a filter button, a read button, a print start button, a delete button, a copy button, a properties button, an estimation start button, an estimation result display button, and a setting button are disposed in this order rightward from the left end side of the job management screen 340. In FIG. 3, only three buttons, namely the filter button, the read button, and the setting button, are highlighted, and the other buttons are grayed out. The buttons which are grayed out are not operable.

In the case of FIG. 3, the information field 344 displays eight print jobs that have been input. A check box for selection, an identifier (ID) for identification, and information corresponding to the job name, information, state, size of document data, date and time of start of reception, date and time of suspension, date and time of completion of printing, and number of document pages are displayed for each print job. All the print jobs are selected or unselected if the check box in the title row is selected.

Figure 4:
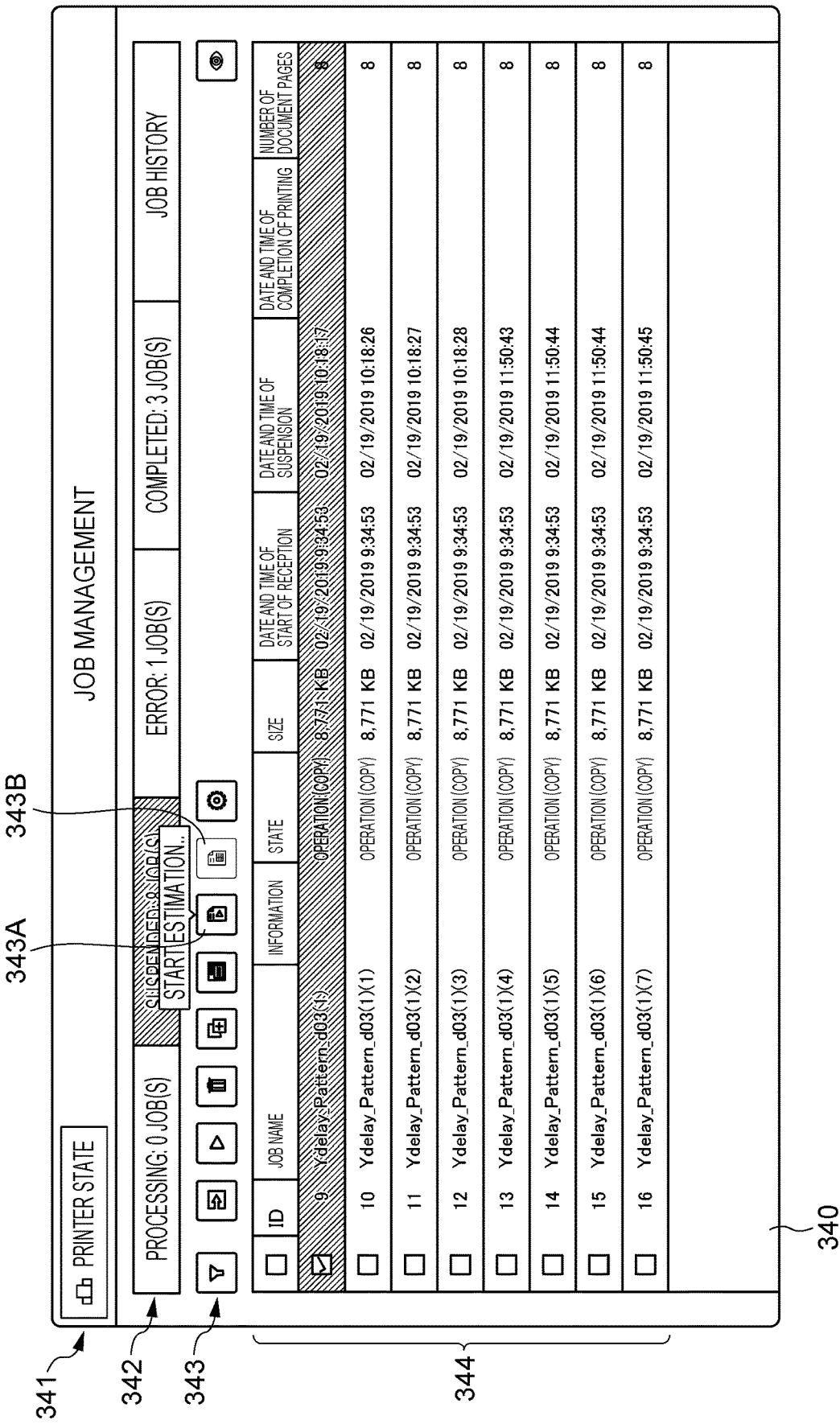
FIG. 4 illustrates an example of the job management screen to be displayed when one print job to be printed by an image forming apparatus is selected.

FIG. 4 illustrates an example of the job management screen 340 to be displayed when one print job to be printed by the image forming apparatus 10 is selected. Portions in FIG. 4 corresponding to those in FIG. 3 are denoted by the corresponding reference numerals.

In the case of FIG. 4, a print job corresponding to a file name "Ydelay_Pattern_d03(1)" is selected. In FIG. 4, only an estimation result display button 343B is grayed out, and the other buttons are highlighted.

When an estimation start button 343A is tapped by the user with a print job selected, an estimation of the selected print job is started. As discussed earlier, the target of the estimation includes the maximum transport speed of the continuous feed paper P which is usable to print the print job, and the travel distance of the continuous feed paper P which is used to print the print job.

Figure 5:
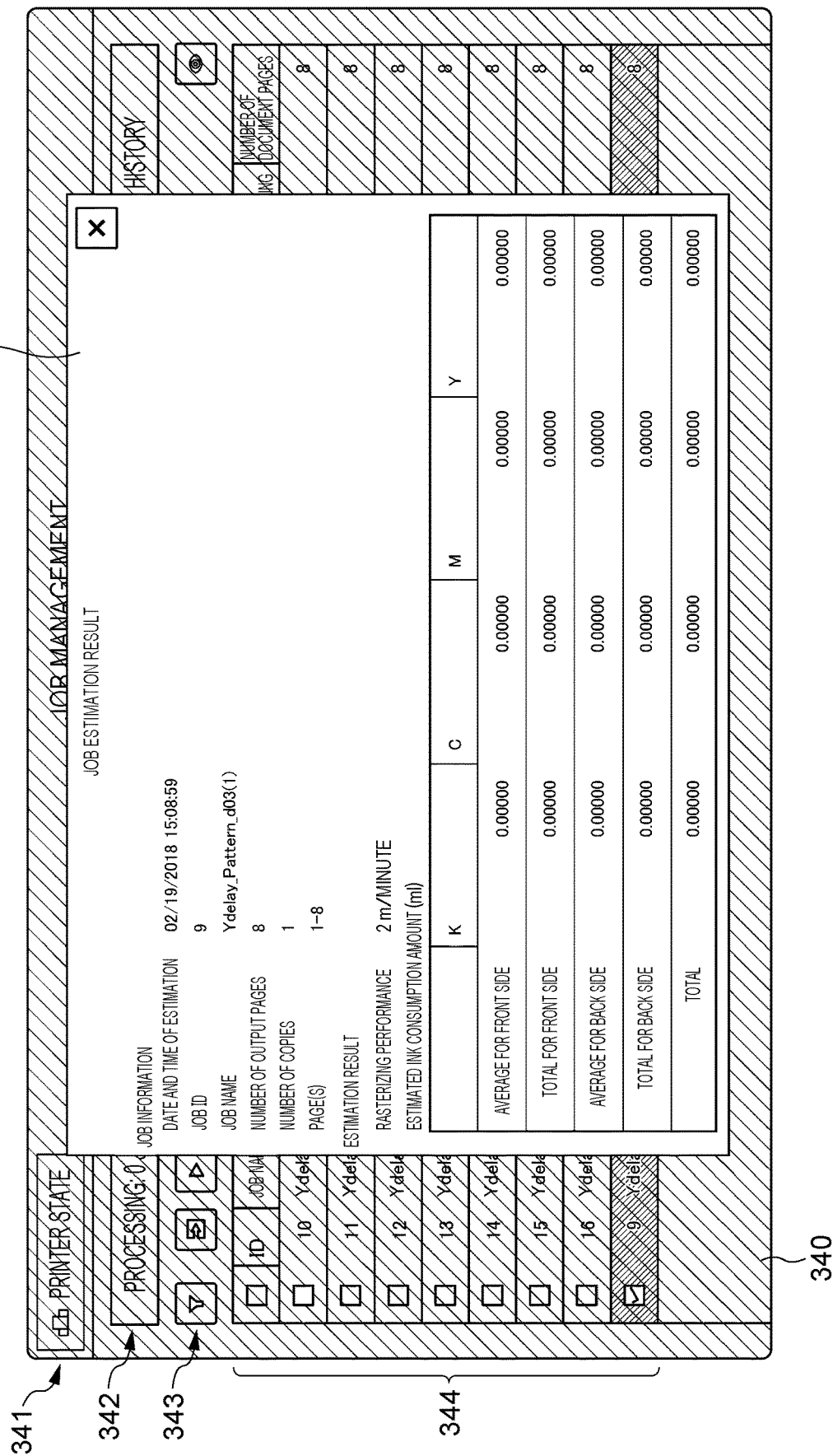
FIG. 5 illustrates an example of the job management screen to be displayed in the case where an estimation result display button is tapped.

FIG. 5 illustrates an example of the job management screen 340 to be displayed in the case where the estimation result display button 343B (see FIG. 4) is tapped. Portions in FIG. 5 corresponding to those in FIG. 3 are denoted by the corresponding reference numerals.

In the case of FIG. 5, a pop-up screen 350 that indicates the print job estimation result is displayed on the front side of the job management screen 340. In the case of FIG. 5, it is indicated that the rasterizing performance for a print job corresponding to a file name "Ydelay_Pattern_d03(1)" is two meters per minute.

Figure 6:
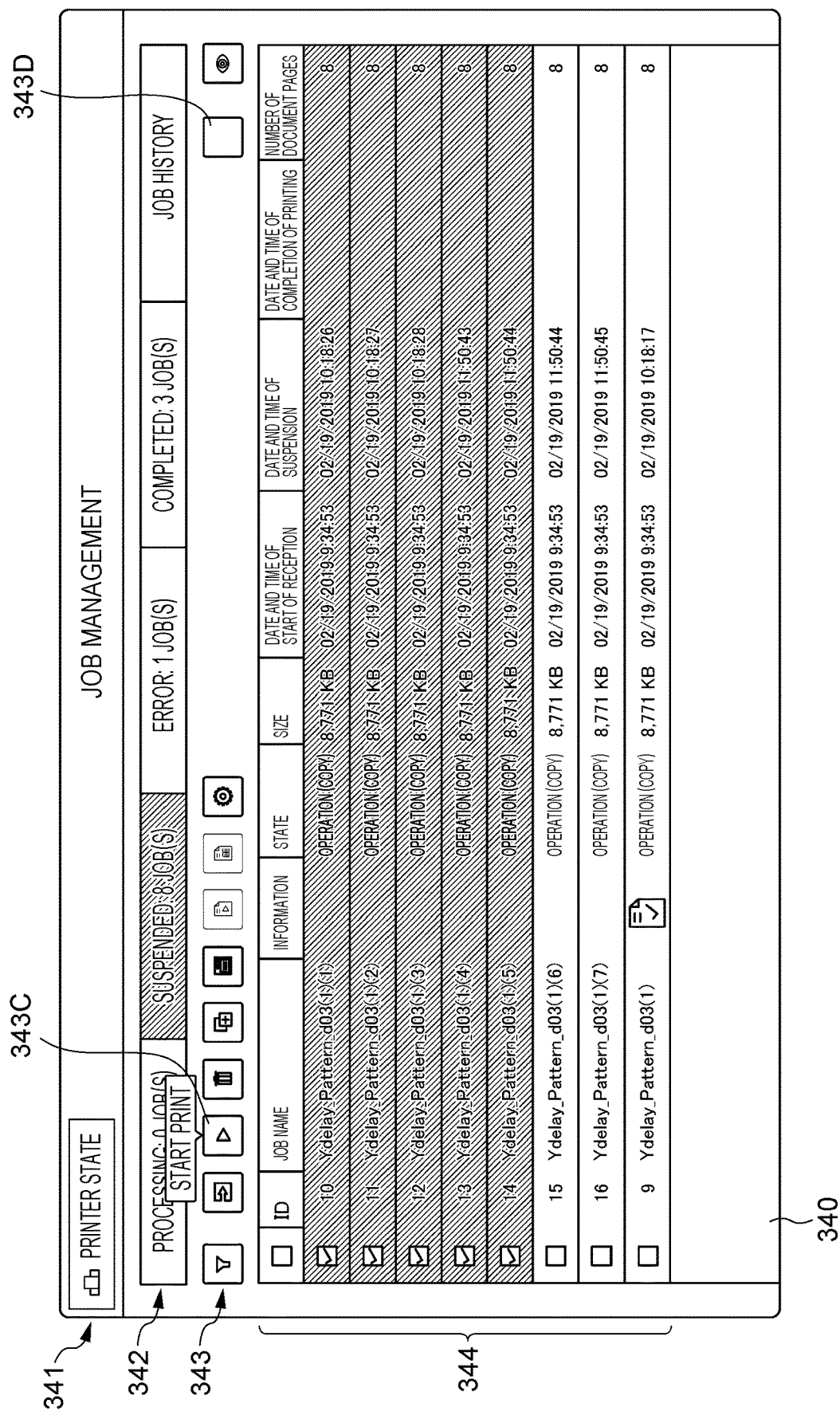
FIG. 6 illustrates an example of the job management screen to be displayed when some print jobs are selected from a job list.

FIG. 6 illustrates an example of the job management screen 340 to be displayed when some print jobs are selected from a job list. Portions in FIG. 6 corresponding to those in FIG. 3 are denoted by the corresponding reference numerals.

In the case of FIG. 6, five print jobs, among the eight print jobs indicated in the information field 344, are selected. Therefore, all the five selected print jobs are highlighted.

In the case of FIG. 6, in addition, a variable transport speed button 343D for use to select the variable transport speed mode is disposed in the operation button field 343. In the case of the present exemplary embodiment, the variable transport speed button 343D is displayed after print jobs are selected.

When a print start button 343C is tapped with the job management screen 340 illustrated in FIG. 6 displayed, the selected print jobs are moved to a processing queue, irrespective of whether or not the variable transport speed mode is selected. The processing queue is also stored in the storage device 32 (see FIG. 1). Print jobs may be added and deleted before the print start button 343C is tapped.

Figure 7:
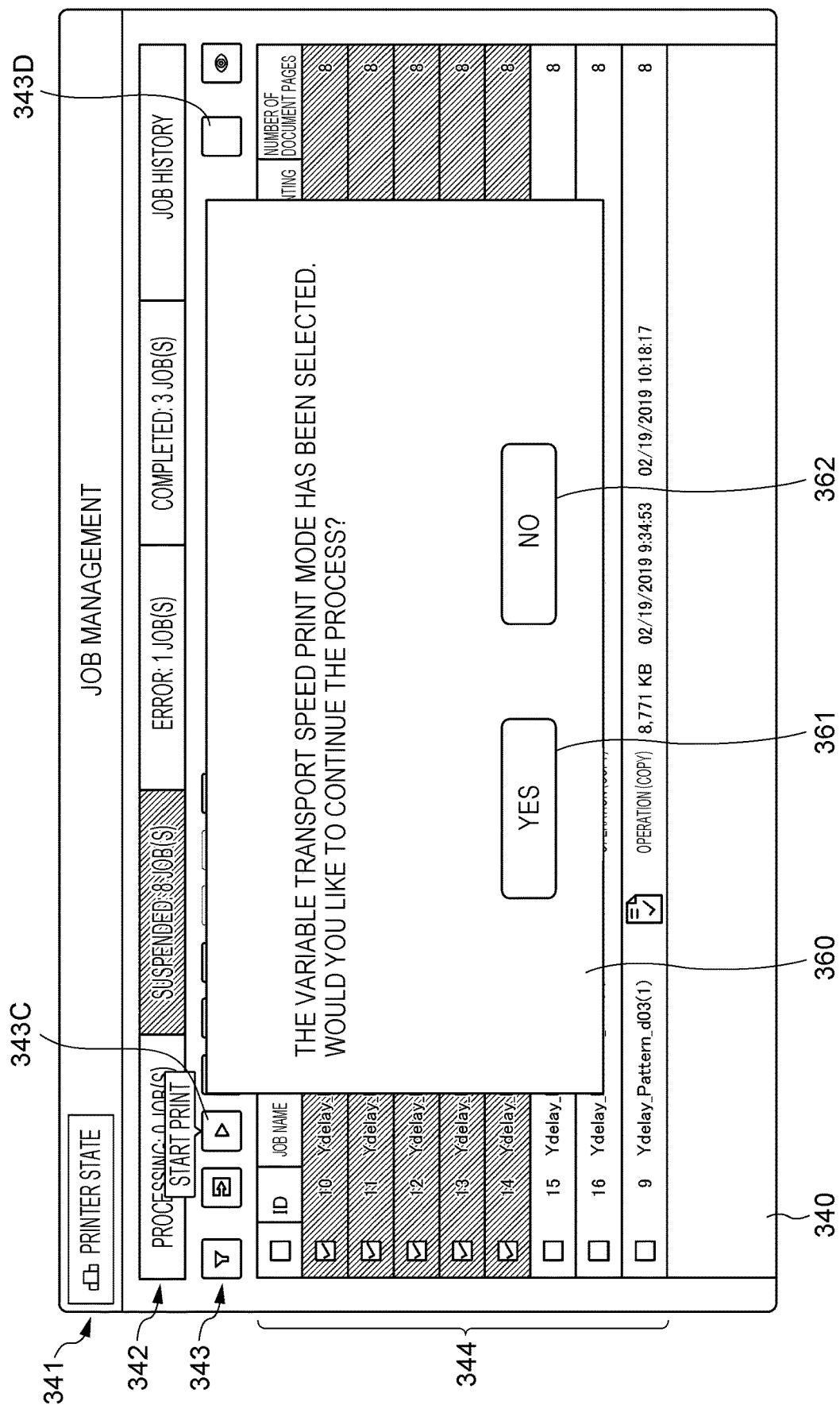
FIG. 7 illustrates an example of the job management screen to be displayed when a print start button is tapped with a variable transport speed button selected.

FIG. 7 illustrates an example of the job management screen 340 to be displayed when the print start button 343C is tapped with the variable transport speed button 343D selected. Portions in FIG. 7 corresponding to those in FIG. 3 are denoted by the corresponding reference numerals.

As illustrated in FIG. 7, a pop-up screen 360 that asks for a confirmation by the user is displayed on the front side of the job management screen 340.

The pop-up screen 360 indicates the content of the selected operation mode and an inquiry about the continuation of the process. Specifically, sentences such as "The variable transport speed print mode has been selected. Would you like to continue the process?" are displayed.

The pop-up screen 360 illustrated in FIG. 7 includes an affirmation button 361 that is operated to continue the process and a negation button 362 that is operated to return to the stage before the print start button 343C is operated.

In the case where an operation of the affirmation button 361 is observed, an estimation of the maximum transport speed etc. is started for each job. In the case where an operation of the negation button 362 is observed, on the other hand, the screen returns to the preceding state, in which the variable transport speed button 343D is operable.

Figure 8:
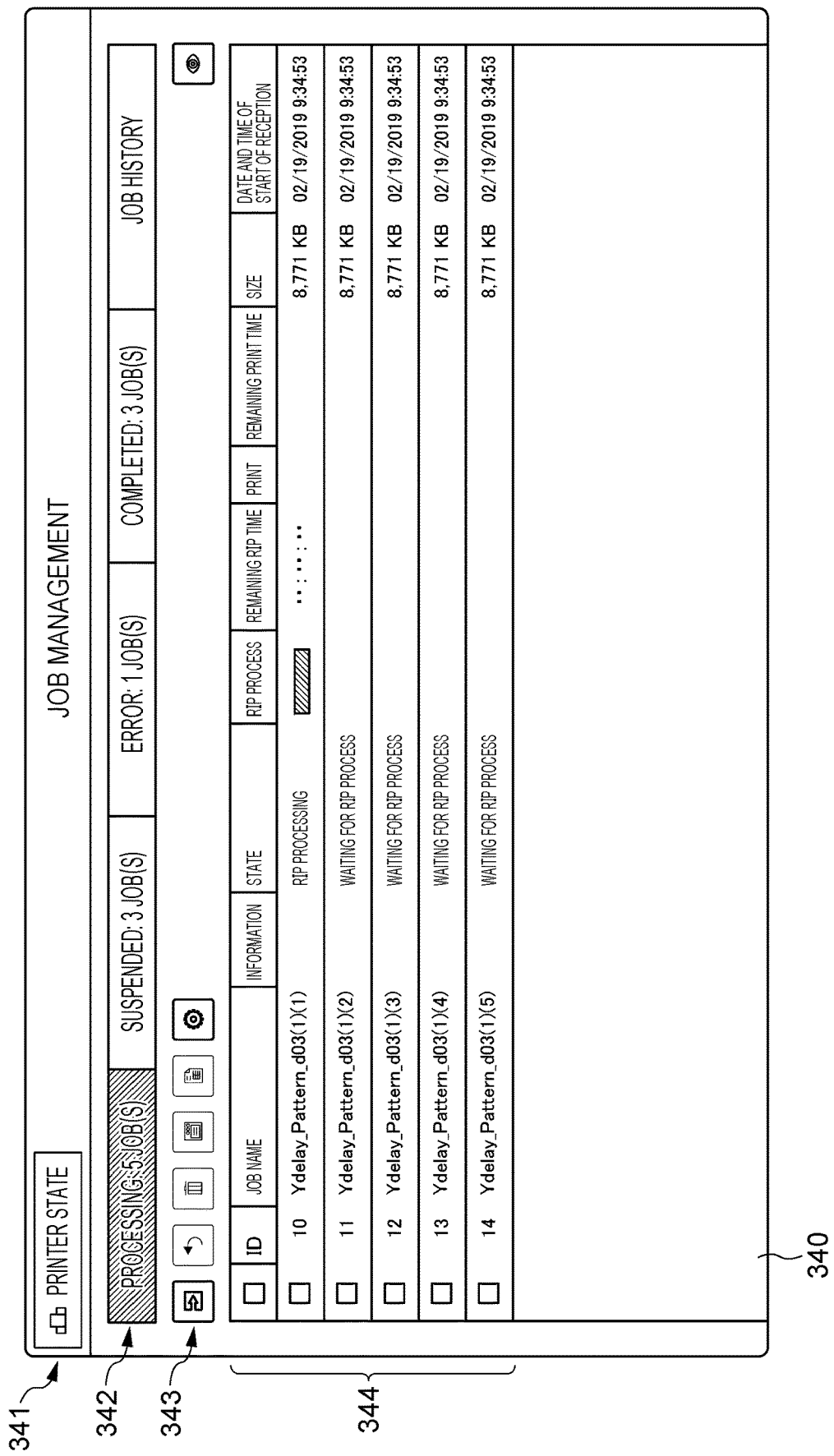
FIG. 8 illustrates an example of the job management screen to be displayed when print jobs are transferred to a print queue.

FIG. 8 illustrates an example of the job management screen 340 to be displayed when print jobs are transferred to a print queue. Portions in FIG. 8 corresponding to those in FIG. 3 are denoted by the corresponding reference numerals.

In the information field 344 in FIG. 8, the five print jobs selected in FIG. 6 are displayed. The buttons that are operable during processing are different from the buttons that are operable during suspension. Therefore, the operation button field 343 in FIG. 8 displays only six buttons. In the case of FIG. 8, only the read button and the setting button are operable. Therefore the four other buttons are grayed out.

In addition, items of information about each print job displayed in the information field 344 are also varied. In the case of FIG. 8, a check box for selection, an ID for identification, and information corresponding to the job name, information, state, raster image processor (RIP) processing, remaining RIP time, print, remaining print time, size of document data, and date and time of start of reception are displayed as information about each print job.

Figure 9A:
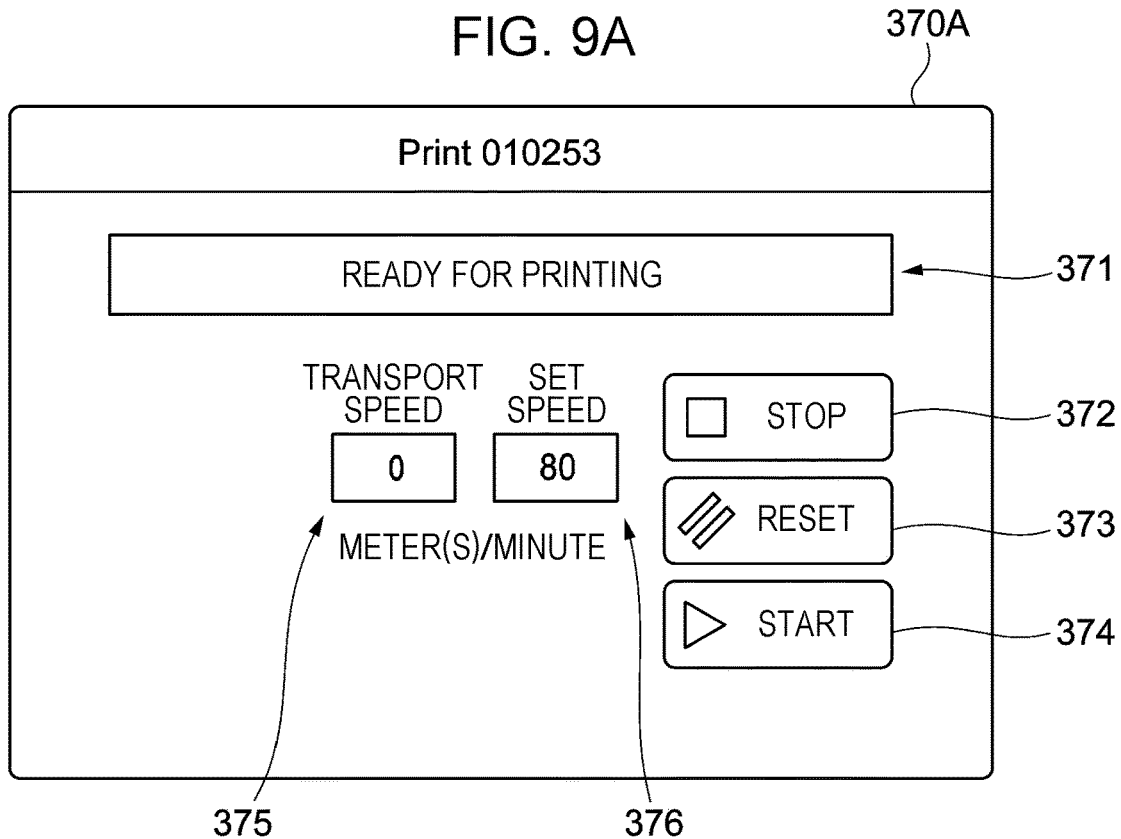
Figure 9B:
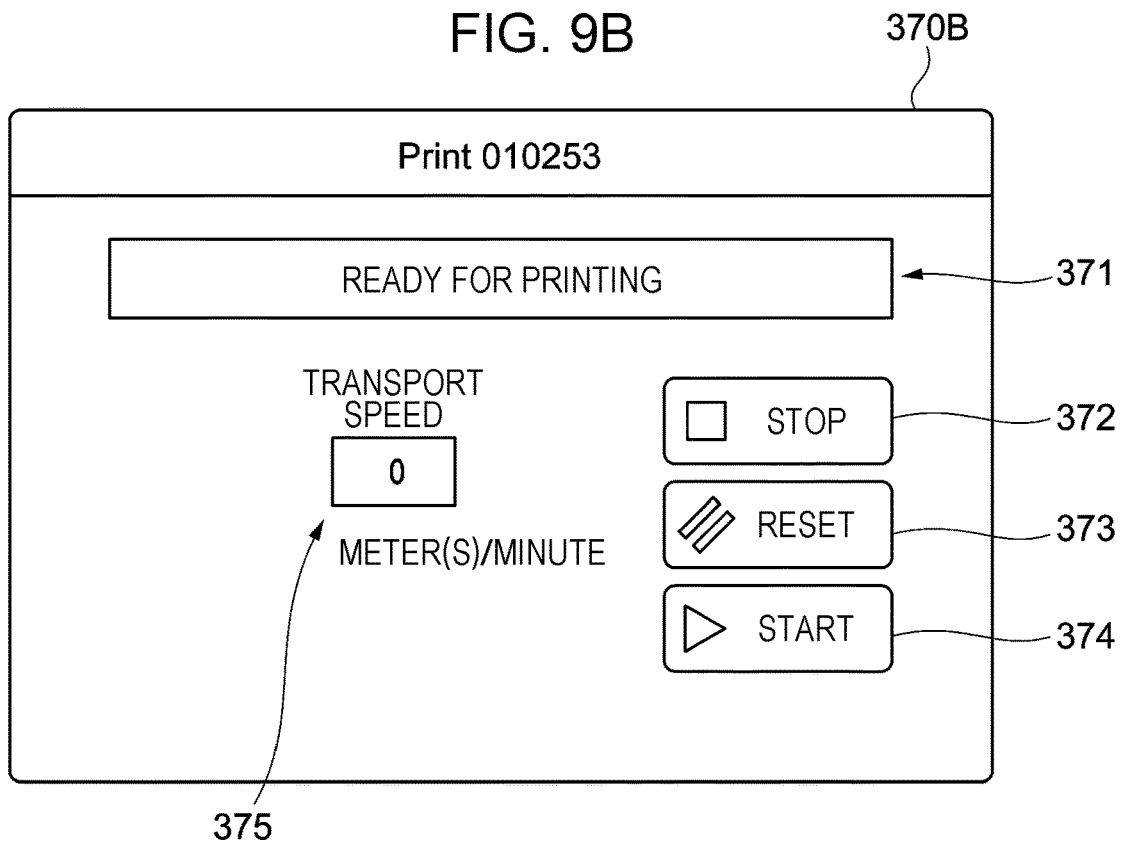

FIGS. 9A and 9B each illustrate an example of job management screens 370A and 370B, respectively, for use to provide the image forming apparatus 10 with an instruction for printing. FIG. 9A illustrates a job management screen 370A to be displayed in the case where the variable transport speed mode is off. FIG. 9B illustrates a job management screen 370B to be displayed in the case where the variable transport speed mode is on.

The job management screen 370A includes, disposed therein, a state field 371 that indicates the current management state, a stop button 372 that is operated to stop the process, a reset button 373 that is operated to reset the progress of the process, a start button 374 that is operated to start printing by the image forming apparatus 10, a transport speed field 375 that indicates the current transport speed, and a set speed field 376 that is used to input a speed in the case where all the print jobs are to be printed at a constant transport speed.

The job management screen 370B which is displayed in the case where the variable transport speed mode is on does not include the set speed field 376. This is because the management server 30 (see FIG. 1) provides an instruction for the transport speed to the image forming apparatus 10 (see FIG. 1).

<Transport Speed Control>

Control on the transport speed of the continuous feed paper P executed by the management server 30 (see FIG. 1) will be described below.

Figure 10:
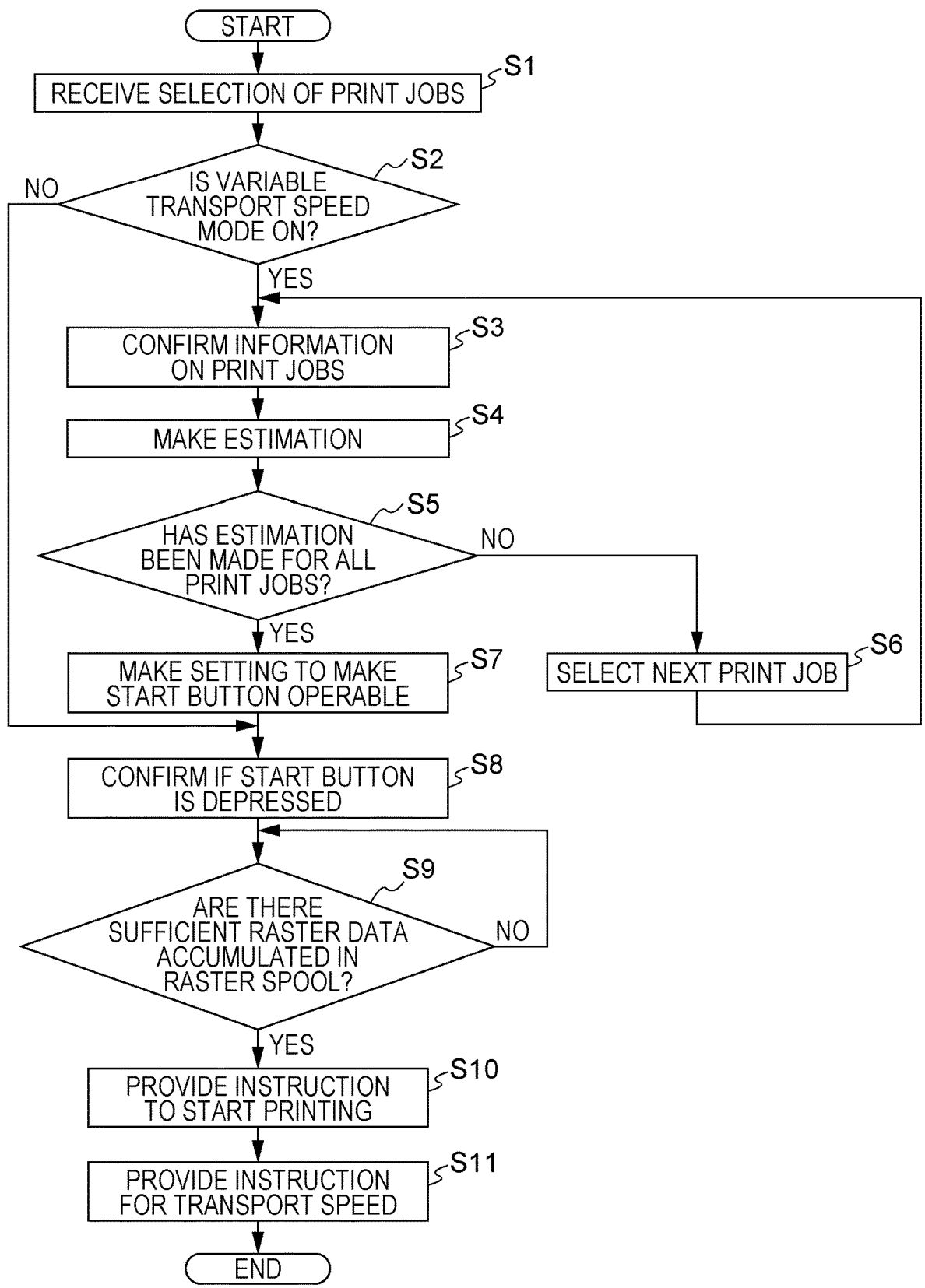
FIG. 10 is a flowchart illustrating an overview of transport speed control executed by the management server according to the first exemplary embodiment.

FIG. 10 is a flowchart illustrating an overview of transport speed control executed by the management server 30 according to the first exemplary embodiment. Symbol S in the drawing denotes "step".

In the case of FIG. 10, the processor 31 (see FIG. 1) of the management server 30 receives selection of print jobs (step S1). Step S1 corresponds to the time when the print start button 343C is tapped on the job management screen 340 illustrated in FIG. 6.

Next, the processor 31 determines whether or not the variable transport speed mode is on (step S2).

In the case where the variable transport speed mode is off, the processor 31 obtains a negative result in step S2. In this case, the processor 31 displays the job management screen 370A (see FIG. 9) on the display device 34 (see FIG. 1).

In the case where the variable transport speed mode is on, on the other hand, the processor 31 obtains a positive result in step S2. In this case, the processor 31 confirms information on the print jobs selected by the user (step S3). In the case of the present exemplary embodiment, the processor 31 retrieves the print jobs, one at a time, in the order of selection by the user, and confirms information on the retrieved print job. The information to be confirmed includes information needed to estimate the maximum transport speed or control the transport speed. For example, the processor 31 confirms the content of the setting of the print job, the size of document data, the file format of the document data, etc. As discussed earlier, the maximum transport speed of each print job is basically determined in accordance with the rasterizing performance for each print job.

Subsequently, the processor 31 makes an estimation of the maximum transport speed etc. on the basis of the confirmed information (step S4).

When an estimation has been made, the processor 31 determines whether or not an estimation has been made for all the print jobs (step S5). In the case where a negative result is obtained in step S5, the processor 31 selects the next print job (step S6), and returns to step S3.

In the case where a positive result is obtained in step S5, on the other hand, the processor 31 makes setting to make the start button operable (step S7). For example, the processor 31 displays the job management screen 370B (see FIG. 9) on the display device 34 (see FIG. 1).

With the job management screen 370A or 370B displayed, the processor 31 confirms if the start button 374 (see FIG. 9) is depressed (step S8).

After that, the processor 31 determines whether or not there are sufficient raster data accumulated in the raster spool 322 (see FIG. 2) (step S9). The processor 31 repeatedly makes the determination in step S9 while a negative result is obtained. Printing is not started while the determination in step S9 is repeatedly made.

When a positive result is obtained in step S9, the processor 31 instructs the image forming apparatus 10 (see FIG. 1) to start printing (step S10).

Subsequently, the processor 31 provides the image forming apparatus 10 with an instruction for the transport speed (step S11). In the case where the variable transport speed mode is off, the processor 31 specifies the transport speed set by the user. In this case, the image forming apparatus 10 starts printing after the transport speed of the continuous feed paper P reaches the specified value.

In the case where the variable transport speed mode is on, on the other hand, the processor 31 specifies the maximum transport speed for each print job corresponding to the raster data. In the case of the present exemplary embodiment, the image forming apparatus 10 controls the transport speed of the continuous feed paper P so as to be as high as possible in the range of the specified maximum transport speed. In the case where the variable transport speed mode is on, printing is started at the same time as transport of the continuous feed paper P is started. That is, printing is started in the state in which the transport speed is zero, unlike the case where printing is executed at a constant speed. In other words, printing is executed with the droplet ejection device 17 ejecting droplets in conjunction with the transport speed also during a period in which the transport speed is increased from zero to the maximum transport speed.

In the case where the maximum transport speed of the next print job is lower than the maximum transport speed of the print job being executed, it is necessary to reduce the transport speed before the next print job is started, as discussed in detail later. In the case of the present exemplary embodiment, the processor 31 provides the image forming apparatus 10 with an instruction for the time to start a speed reduction and the transport speed as a target for the speed reduction. Any method to implement a reduction of the transport speed may be used as long as the transport speed is reduced to the target transport speed before the next print job is started.

Figure 11:
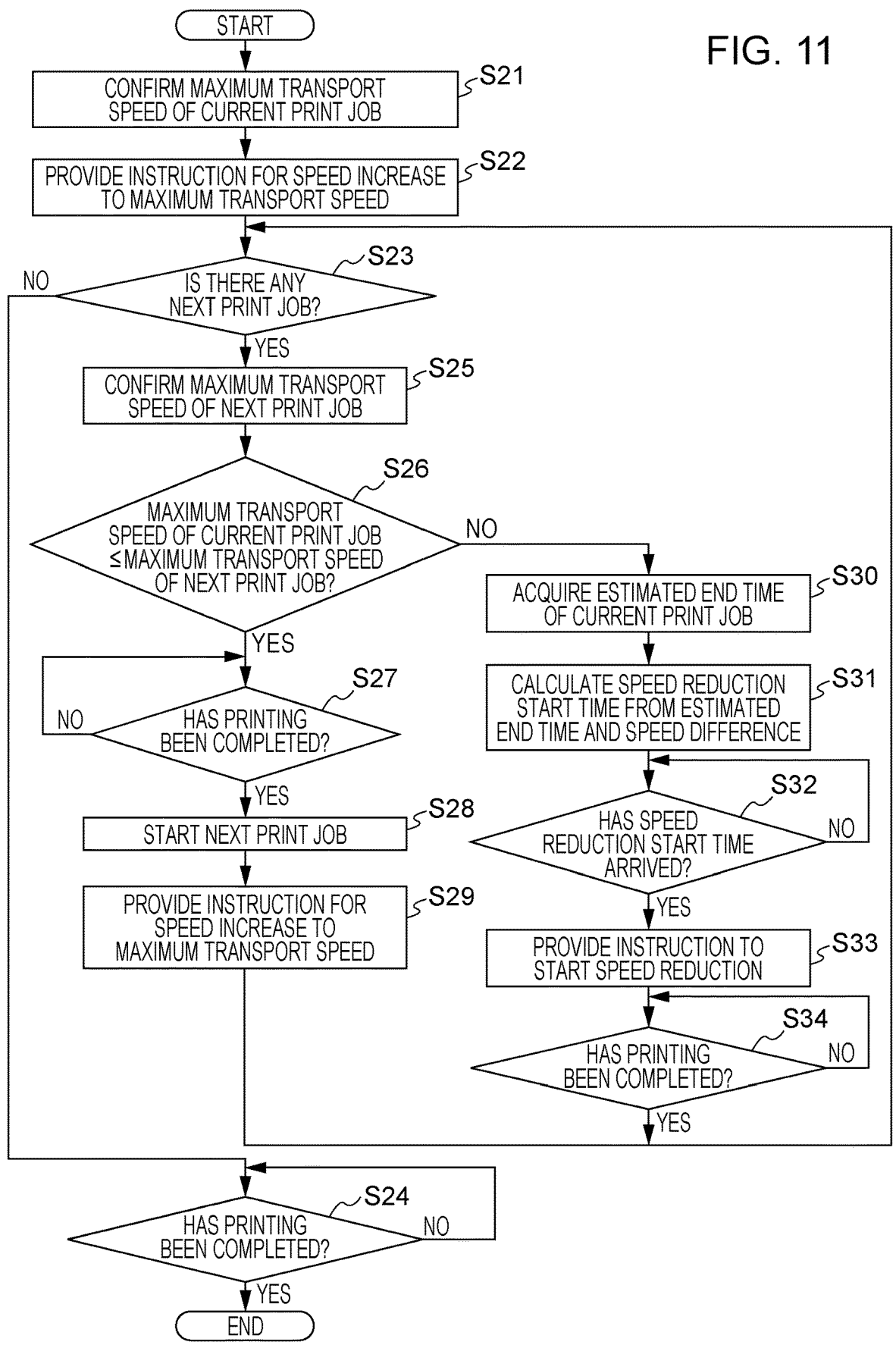
FIG. 11 is a flowchart illustrating processing operation executed in step S11 in the case where the variable transport speed mode is selected in the first exemplary embodiment.

FIG. 11 is a flowchart illustrating processing operation executed in step S11 in the case where the variable transport speed mode is selected in the first exemplary embodiment. Symbol S in the drawing denotes "step".

First, the processor 31 (see FIG. 1) confirms the maximum transport speed of the current print job (step S21).

Next, the processor 31 provides an instruction for a speed increase to the confirmed maximum transport speed (step S22). Upon receiving the instruction, the image forming apparatus 10 (see FIG. 1) starts transporting the continuous feed paper P, and at the same time starts printing using the raster data received from the management server 30 (see FIG. 1). In the case of the present exemplary embodiment, the image forming apparatus 10 increases the transport speed at a constant variation rate. That is, the image forming apparatus 10 linearly increases the transport speed.

When printing is started, the processor 31 determines whether or not there is any next print job (step S23). In the case where the current print job is the last, the processor 31 obtains a negative result in step S23. In the case of the present exemplary embodiment, the processor 31 determines whether or not printing has been completed (step S24) after obtaining a negative result in step S23. The processor 31 repeatedly makes the determination in step S24 while a negative result is obtained in step S24.

In the case where a positive result is obtained in step S24, the processor 31 ends control on the transport speed. For example, transport of the continuous feed paper P is stopped.

In the case where a different print job is scheduled to follow the current print job, on the contrary, the processor 31 obtains a positive result in step S23. In the case of the present exemplary embodiment, the processor 31 confirms the maximum transport speed of the next print job (step S25) after obtaining a positive result in step S23.

Next, the processor 31 determines whether or not the maximum transport speed of the next print job is equal to or more than the maximum transport speed of the current print job (step S26). The maximum transport speed of the current print job is an example of a first allowable value. The maximum transport speed of the next print job is an example of a second allowable value.

In the case where a positive result is obtained in step S26, it is not necessary to reduce the transport speed before the next print job is started, and it is possible to increase the transport speed to the maximum transport speed of the current print job during execution of the current print job. In the case where the time needed to execute the print job is shorter than the time needed to increase the transport speed, however, there is a possibility that printing of the print job being processed is ended before the transport speed of the continuous feed paper P reaches the maximum transport speed.

In the case where a negative result is obtained in step S26, on the other hand, it is necessary to reduce the transport speed to the maximum transport speed of the next print job before the next print job is started.

In the case where a positive result is obtained in step S26, the processor 31 determines whether or not printing has been completed (step S27). The processor 31 repeatedly makes the determination in step S27 while a negative result is obtained in step S27.

When a positive result is obtained in step S27, the processor 31 starts the next print job (step S28). Subsequently, the processor 31 provides an instruction for a speed increase to the maximum transport speed confirmed in step S25 (step S29). After that, the processor 31 returns to the determination process in step S23.

In the case where a negative result is obtained in step S26, on the other hand, the processor 31 acquires an estimated end time of the current print job (step S30). The estimated end time is calculated on the basis of the length and the transport speed of the continuous feed paper P which is used in the print job. In the case of FIG. 11, the variable transport speed mode is selected, and thus the time when the print job is ended is estimated also in consideration of variations in the transport speed.

Next, the processor 31 calculates the time (speed reduction start time) to start a speed reduction from the estimated end time and a speed difference (step S31). The speed difference is given as the difference between the maximum transport speed of the current print job and the maximum transport speed of the next print job.

In the case of the present exemplary embodiment, the transport speed is reduced at a constant variation rate. That is, the image forming apparatus 10 linearly varies the transport speed. The speed reduction start time is defined as the time retroactive from the estimated end time by the time needed to eliminate the speed difference. In the case where it is necessary to make a correction to the estimated end time in consideration of the time needed for the speed reduction, however, the speed reduction start time is calculated with reference to the estimated end time after the correction. The speed reduction start time may be calculated otherwise.

When the speed reduction start time is calculated, the processor 31 determines whether or not the speed reduction start time has arrived (step S32). The processor 31 repeatedly makes the determination in step S32 while a negative result is obtained in step S32.

When the speed reduction start time eventually arrives, the processor 31 obtains a positive result in step S32, and instructs the image forming apparatus 10 to start a speed reduction (step S33).

After that, the processor 31 determines whether or not printing has been completed (step S34). The processor 31 repeatedly makes the determination in step S34 while a negative result is obtained in step S34. When a positive result is obtained in step S34, the processor 31 returns to the determination process in step S23.

<Example of Transport Speed Control>

Figure 12:
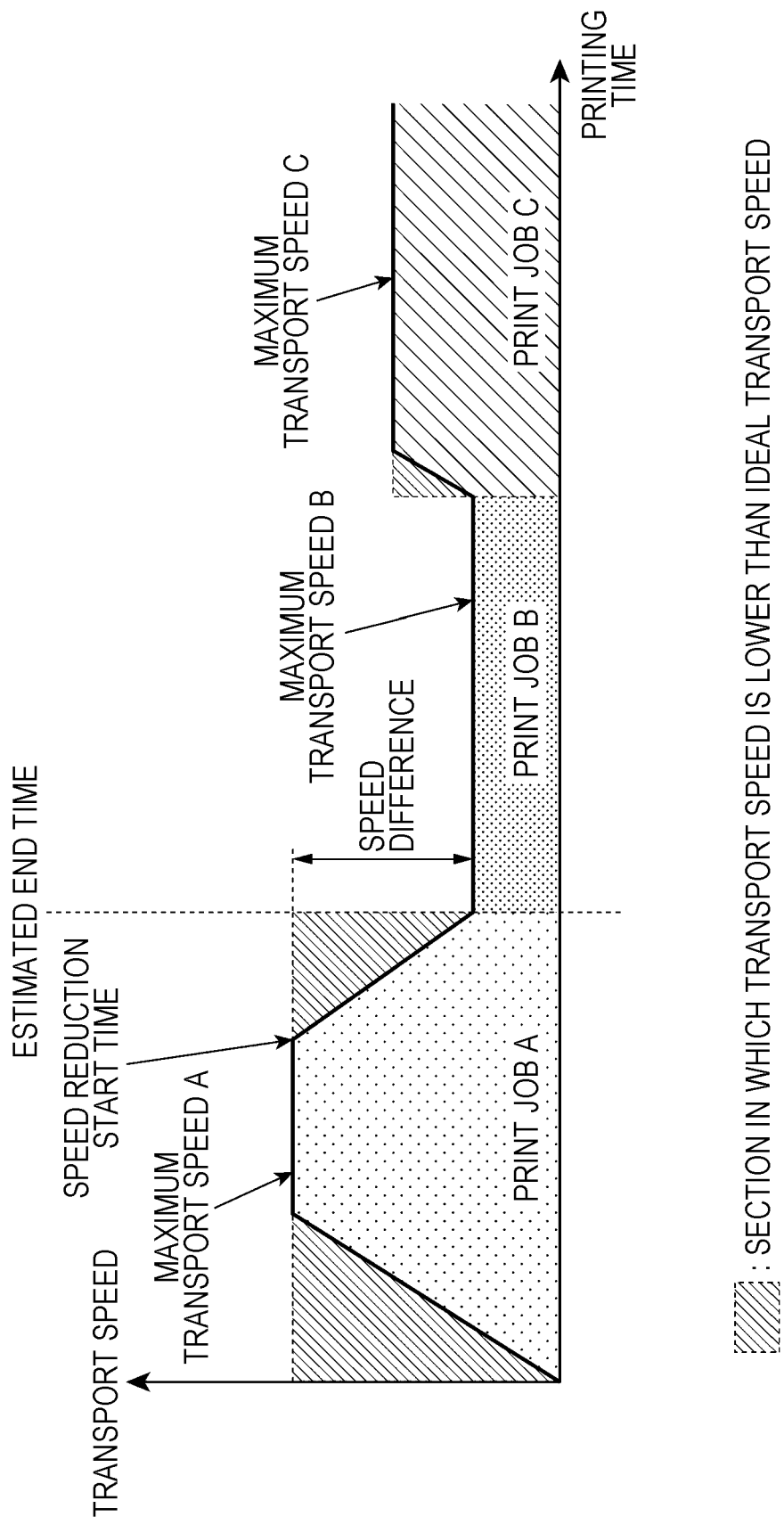
FIG. 12 illustrates an example of transport speed control according to the first exemplary embodiment.

FIG. 12 illustrates an example of transport speed control according to the first exemplary embodiment. In the example in FIG. 12, three print jobs, namely a print job A, a print job B, and a print job C, are scheduled to be executed. The print job A, the print job B, and the print job C are to be executed in this order. The maximum transport speed of the print job A is the highest, that of the print job C is the second highest, and that of the print job B is the lowest.

First, to start printing the print job A, the processor (see FIG. 1) provides the image forming apparatus 10 (see FIG. 1) with an instruction for a speed increase to a maximum transport speed A. This process corresponds to steps S21 and S22 (see FIG. 11). As illustrated in FIG. 12, printing is started in the state in which the transport speed is zero in the case where the variable transport speed mode is on. The transport speed of the continuous feed paper P is linearly increased to the maximum transport speed A of the print job A.

When the speed of transport of the continuous feed paper P by the image forming apparatus 10 reaches the maximum transport speed A of the print job A, the transport speed is maintained at the maximum transport speed A until the speed reduction start time arrives.

In the case of FIG. 12, the print job B is scheduled to follow the print job A. Therefore, the processor 31 compares the maximum transport speed A of the print job A and the maximum transport speed B of the print job B. In the case of FIG. 12, the maximum transport speed B of the print job B to be executed next is lower than the maximum transport speed A of the print job A being executed. Therefore, the processor 31 calculates the time retroactive from the estimated end time of the print job A by the time needed to reduce the transport speed as the speed reduction start time. This process corresponds to steps S26, S30, and S31 (see FIG. 11).

When the speed reduction start time arrives, the transport speed of the continuous feed paper P starts being reduced, and the transport speed of the image forming apparatus 10 is reduced from the maximum transport speed A of the print job A to the maximum transport speed B of the next print job B.

When printing of the print job A is ended, printing of the print job B is started. In the case of FIG. 12, the transport speed of the image forming apparatus 10 is already the maximum transport speed B of the print job B when the print job B is started.

Meanwhile, the maximum transport speed C of the print job C to be executed next to the print job B is higher than the maximum transport speed B of the print job B. Therefore, the transport speed is maintained at the maximum transport speed B during a period of the print job B.

When printing of the print job B is ended, printing of the print job C is started. In the case of FIG. 12, the maximum transport speed C of the print job C is higher than the maximum transport speed B of the print job B. Therefore, when the print job C is started, the transport speed of the image forming apparatus 10 is linearly increased from the maximum transport speed B of the print job B to the maximum transport speed C of the print job C, and thereafter maintained at the maximum transport speed C until the print job C is ended. However, it is also possible to reduce the transport speed so as to return to zero when the print job C is ended.

Second Exemplary Embodiment

Subsequently, a second exemplary embodiment will be described. The configuration of the image forming system for use in the present exemplary embodiment is also the same as that according to the first exemplary embodiment.

In the case of the first exemplary embodiment, print jobs are scheduled in the order of selection by the user. In the case of the second exemplary embodiment, however, print jobs are rearranged in the ascending order of the maximum transport speed in the case where the variable transport speed mode is selected.

Figure 13:
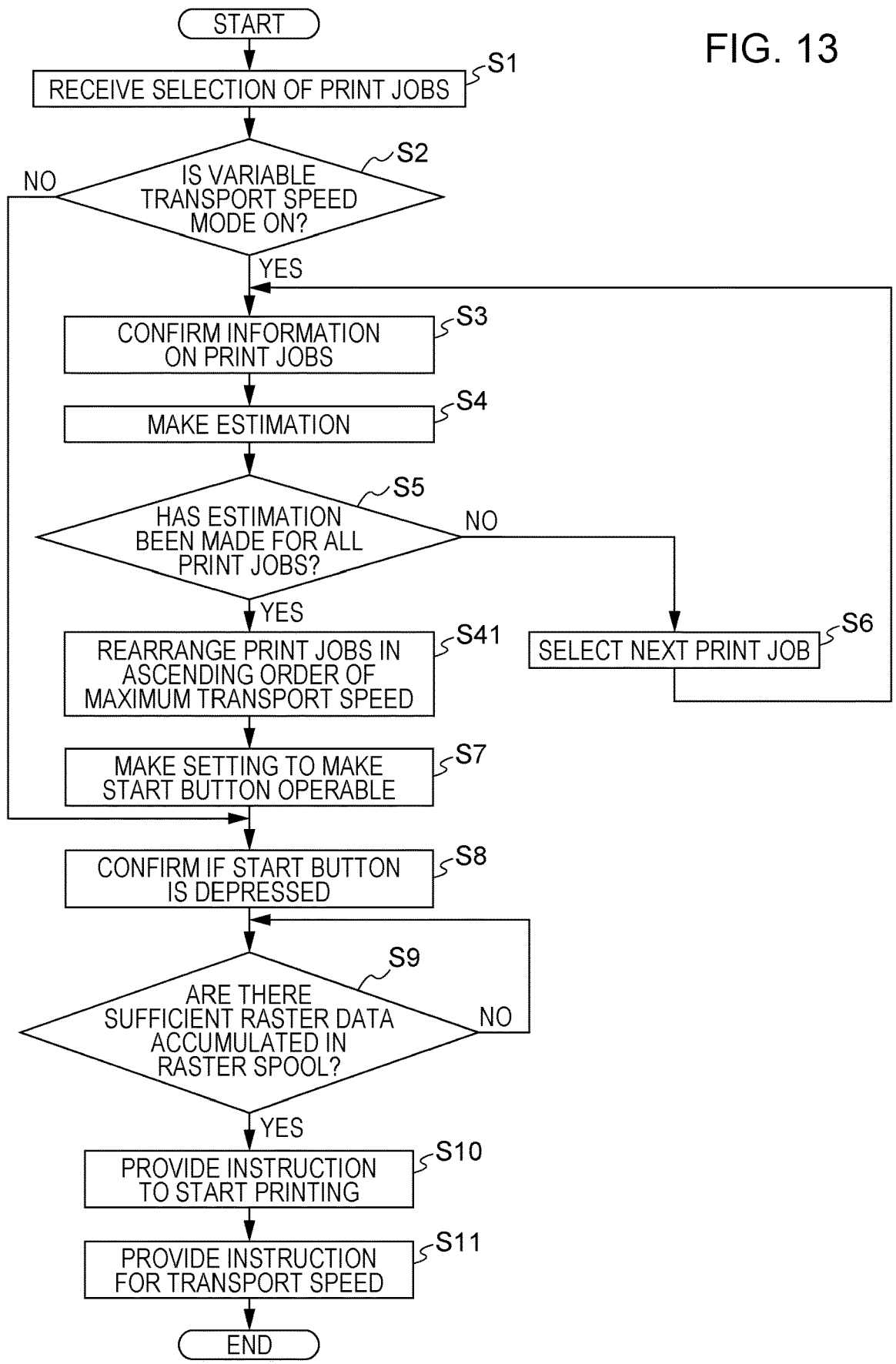
FIG. 13 is a flowchart illustrating an overview of transport speed control executed by the management server according to a second exemplary embodiment.

FIG. 13 is a flowchart illustrating an overview of transport speed control executed by the management server 30 (see FIG. 1) according to the second exemplary embodiment. Symbol S in the drawing denotes "step". Portions in FIG. 13 corresponding to those in FIG. 10 are denoted by the corresponding reference numerals.

FIG. 13 is different from FIG. 10 in that the processor (see FIG. 1) rearranges the print jobs in the ascending order of the maximum transport speed (step S41) after an estimation is made for all the print jobs. The print jobs may be rearranged each time an estimation of the maximum transport speed is made in step S4.

In the case of the second exemplary embodiment, the content of an instruction for a transport speed to be achieved after an instruction to start printing is provided is simplified compared to the first exemplary embodiment.

Figure 14:
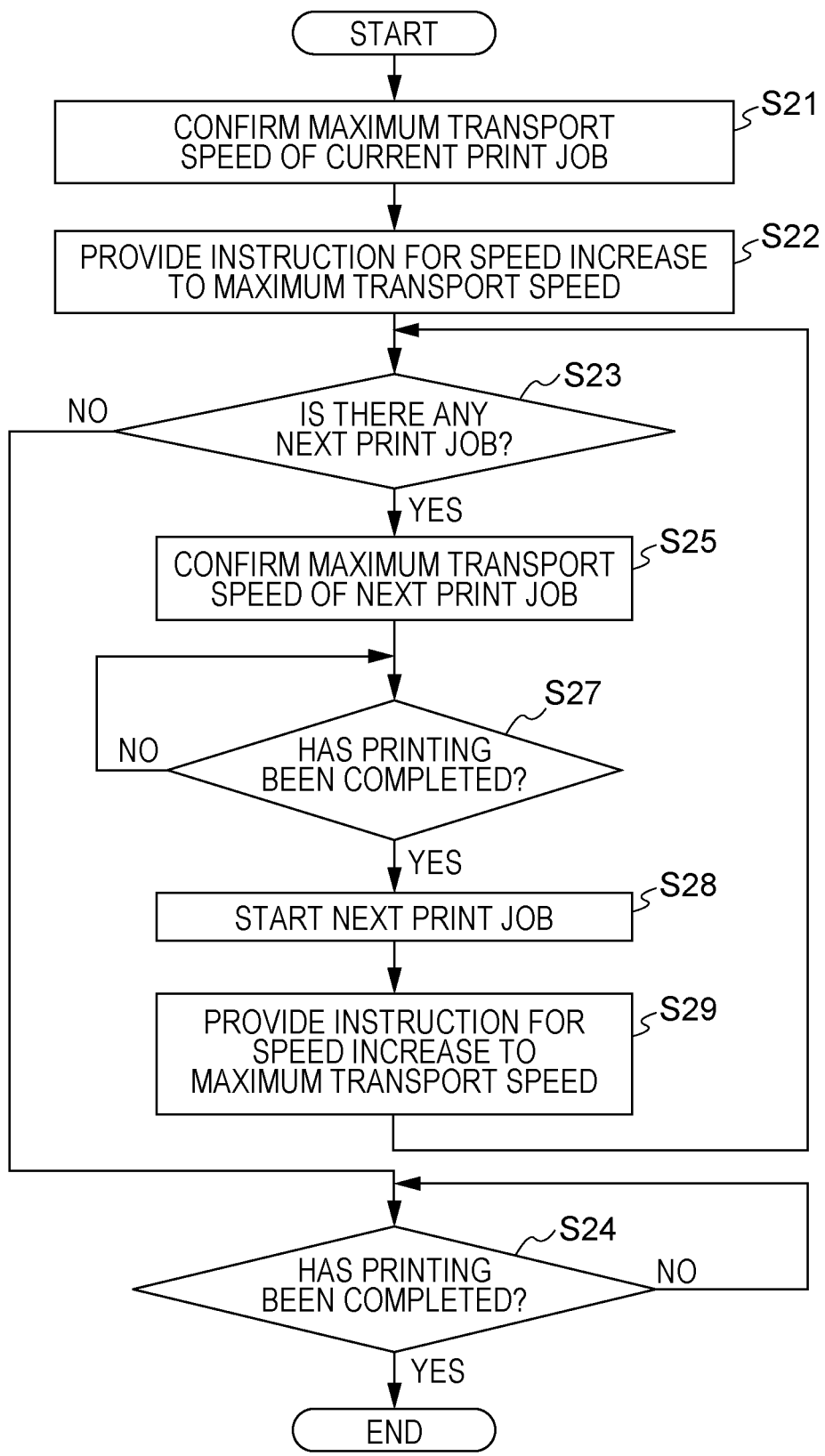
FIG. 14 is a flowchart illustrating processing operation executed in step S11A in the case where the variable transport speed mode is selected in the second exemplary embodiment.

FIG. 14 is a flowchart illustrating processing operation executed in step S11A in the case where the variable transport speed mode is selected in the second exemplary embodiment. Portions in FIG. 14 corresponding to those in FIG. 11 are denoted by the corresponding reference numerals.

The content of step S11A illustrated in FIG. 14 is obtained by removing steps S26 and S30 to S34 from the content of step S11 illustrated in FIG. 11. Thus, preliminarily rearranging scheduled print jobs in the ascending order of the maximum transport speed eliminates the need for the processes for speed reduction.

<Example of Transport Speed Control>

Figure 15:
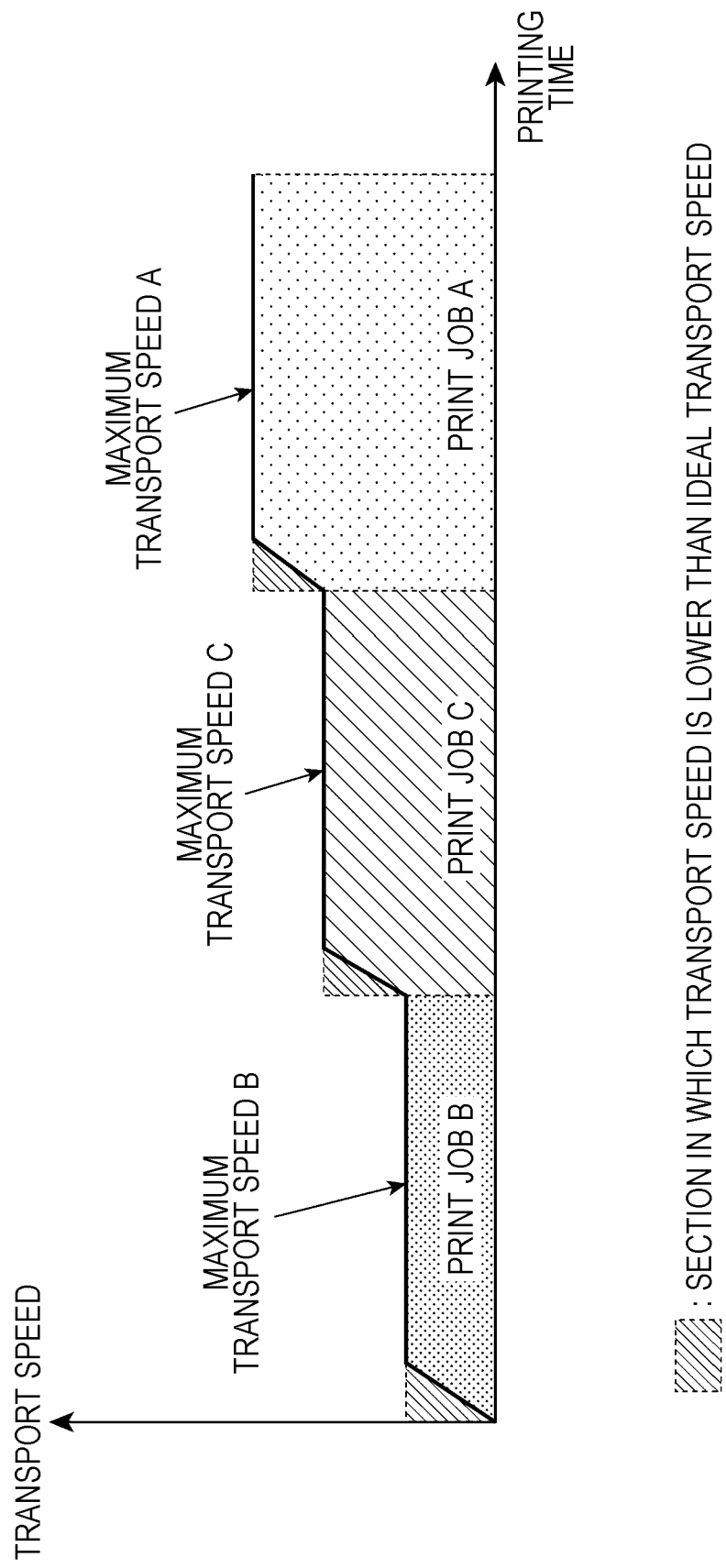
FIG. 15 illustrates an example of transport speed control according to the second exemplary embodiment.

FIG. 15 illustrates an example of transport speed control according to the second exemplary embodiment. Portions in FIG. 15 corresponding to those in FIG. 12 are denoted by the corresponding reference numerals.

Also in the case of FIG. 15, three print jobs, namely a print job A, a print job B, and a print job C, are scheduled to be executed. It should be noted, however, that the order of execution is the print job B, and the print job B, and the print job A as a result of changing the order of execution in the descending order of the maximum transport speed. In the case of this control, a speed reduction is not needed when a transition is made from the print job being executed to the next print job.

In the case where the variable transport speed mode is selected by the user, a button for selecting whether or not to allow a change in the printing order may be disposed on the job management screen 340 (see FIG. 6).

Third Exemplary Embodiment

Subsequently, a third exemplary embodiment will be described. The configuration of the image forming system for use in the present exemplary embodiment is also the same as that according to the first exemplary embodiment.

In the case of the first exemplary embodiment discussed earlier, it is assumed that there is enough time for the transport speed to be reduced after reaching the maximum transport speed, before the time to execute the next print job. However, enough time may not be secured for an increase or a reduction of the transport speed, depending on the content of the print jobs. In this case, the maximum transport speeds corresponding to the print jobs may not be reached. In the case with a speed reduction, in particular, there is a higher possibility that the maximum transport speeds are not reached.

Figure 16:
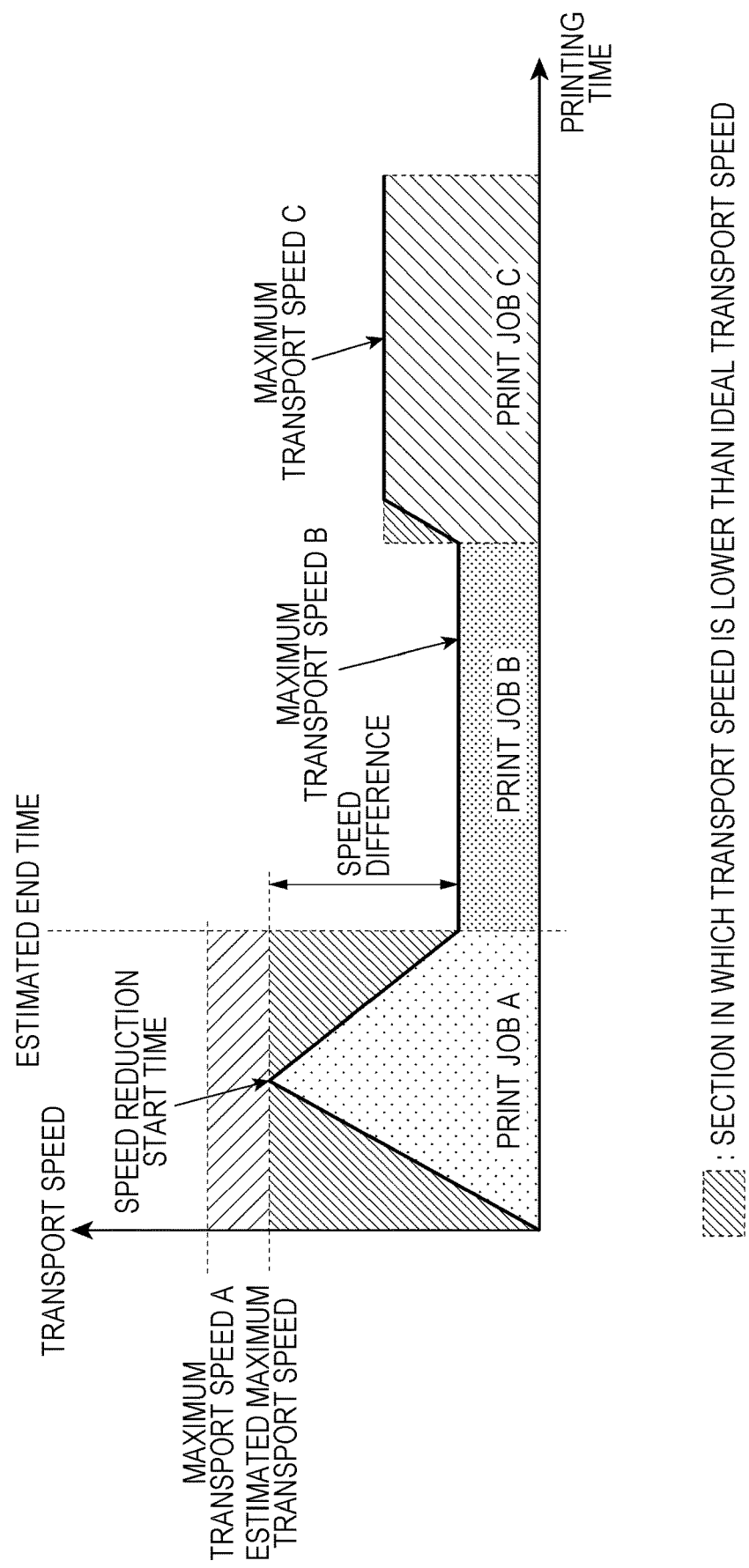
FIG. 16 illustrates an example of transport speed control according to a third exemplary embodiment.

FIG. 16 illustrates an example of transport speed control according to the third exemplary embodiment. Portions in FIG. 16 corresponding to those in FIG. 12 are denoted by the corresponding reference numerals.

In the case of FIG. 16, the time needed to print the print job A which is executed first is shorter than that in the case of FIG. 12. In this case, if the transport speed is increased to the maximum transport speed A of the print job A, the transport speed may not be reduced to the maximum transport speed B before the print job B is started. Thus, in the case of the third exemplary embodiment, as illustrated in FIG. 16, a speed reduction is started when the transport speed of the print job A being executed reaches an estimated maximum transport speed that is lower than the maximum transport speed A of the print job A. In the case where variations in the transport speed are to be reduced to be as small as possible, the estimated maximum transport speed may be set to be still lower in order to increase the period in which the transport speed of the print job A being executed is controlled so as to be constant.

Figure 17:
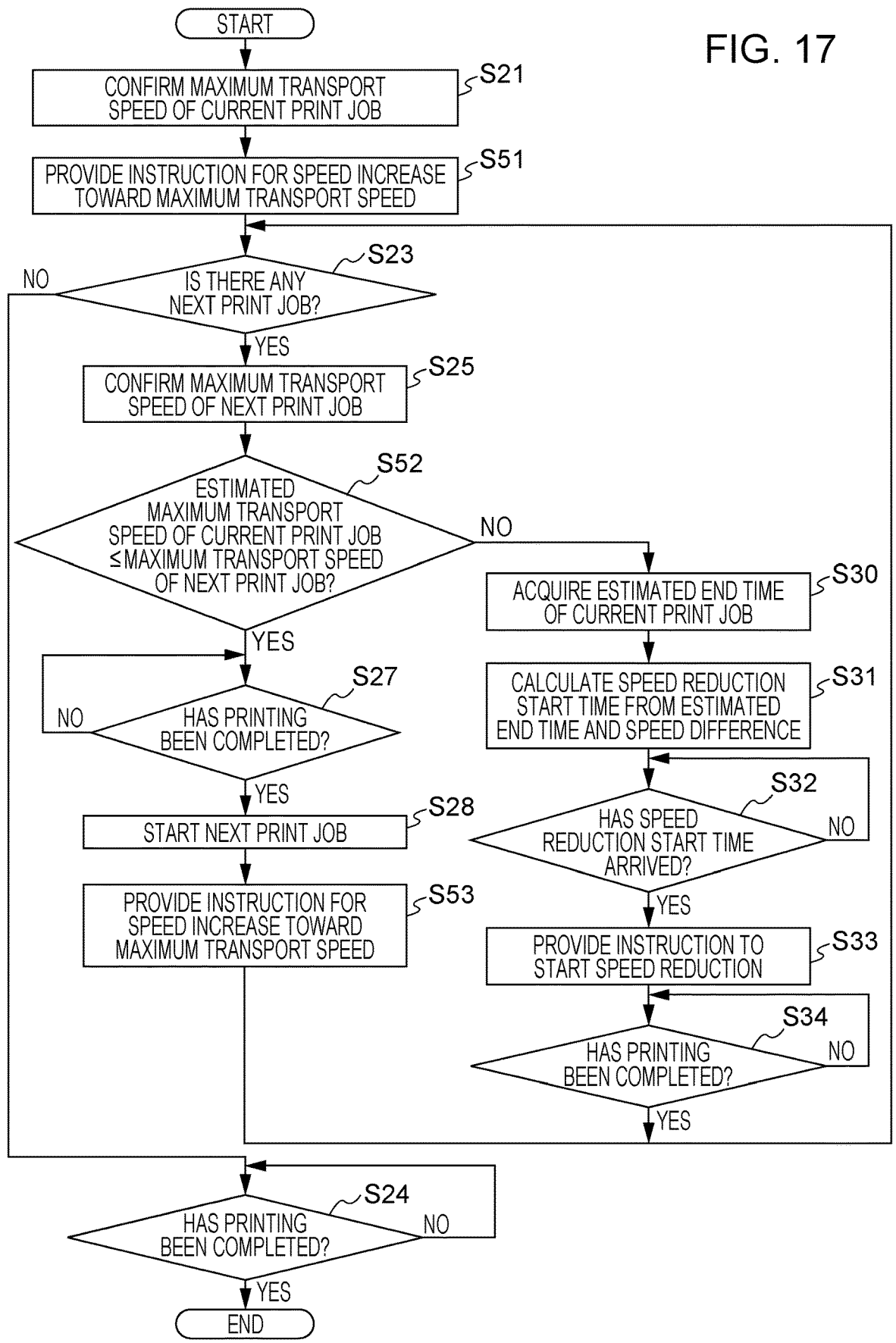
FIG. 17 is a flowchart illustrating processing operation executed in step S11 in the case where the variable transport speed mode is selected in the third exemplary embodiment.

FIG. 17 is a flowchart illustrating processing operation executed in step S11 in the case where the variable transport speed mode is selected in the third exemplary embodiment. Symbol S in the drawing denotes "step". Portions in FIG. 17 corresponding to those in FIG. 11 are denoted by the corresponding reference numerals. The processor 31 according to the present exemplary embodiment executes steps S1 to S10 illustrated in FIG. 10 after step S11.

In the case of FIG. 17, when the processor 31 (see FIG. 1) confirms the maximum transport speed of the current print job (step S21), the processor 31 provides an instruction for a speed increase toward the confirmed maximum transport speed (step S51).

Upon receiving the instruction, the image forming apparatus 10 (see FIG. 1) starts transporting the continuous feed paper P, and at the same time starts printing using the raster data received from the management server 30 (see FIG. 1). In the case of the present exemplary embodiment, the image forming apparatus 10 increases the transport speed at a constant variation rate. That is, the image forming apparatus 10 linearly varies the transport speed.

After printing is started, the processor 31 determines whether or not there is any next print job (step S23). In the case where the current print job is the last, the processor 31 obtains a negative result in step S23, and then determines whether or not printing has been completed (step S24). If a positive result is obtained in step S24, the processor 31 ends control on the transport speed.

In the case where a positive result is obtained in step S23, on the contrary, the processor 31 confirms the maximum transport speed of the next print job (step S25).

Next, the processor 31 determines whether or not the maximum transport speed of the next print job is equal to or more than the estimated maximum transport speed of the current print job (step S52). As described in relation to FIG. 16, the estimated maximum transport speed is an estimated maximum value of the transport speed determined in accordance with the time allocated to execution of the print job and the relationship with the next print job, unlike the maximum transport speed which is calculated in accordance with only information on the print job alone.

In the case where a positive result is obtained in step S52, however, it is not necessary to reduce the transport speed before the next print job is started. Therefore, the processor 31 determines whether or not printing has been completed (step S27). When a positive result is obtained in step S27, the processor 31 starts the next print job (step S28). In the case of the present exemplary embodiment, the processor 31 provides an instruction for a speed increase toward the maximum transport speed confirmed in step S25 (step S53). After that, the processor 31 returns to the determination process in step S23.

In the case where a negative result is obtained in step S52, on the other hand, the processor 31 executes the processes in steps S30 to S34, as in the first exemplary embodiment. When a positive result is obtained in step S34, the processor 31 returns to the determination process in step S23. The speed difference during a speed reduction is given as the difference between the estimated maximum transport speed of the current print job and the maximum transport speed of the next print job.

Other Exemplary Embodiments

While exemplary embodiments of the present disclosure have been described above, the technical scope of the present disclosure is not limited to the exemplary embodiments discussed earlier. It is apparent from the following claims that exemplary embodiments obtained by making a variety of modifications and improvements to the exemplary embodiments discussed earlier also fall within the technical scope of the present disclosure.

In the exemplary embodiments discussed earlier, in the case where the variable transport speed mode is selected, the management server 30 (see FIG. 1) makes an estimation of the maximum transport speed of each print job, and specifies the transport speed of the image forming apparatus 10 (see FIG. 1) on the basis of the estimated maximum transport speed. However, the image forming apparatus 10 alone may execute the function of controlling the transport speed during execution of a print job. In this case, the image forming apparatus 10 is an example of the information processing system.

In addition, the management server 30 and the image forming apparatus 10 may cooperate with each other to execute the function of controlling the transport speed during execution of a print job. In this case, the management server 30 and the image forming apparatus 10 are an example of the information processing system.

In the exemplary embodiments discussed earlier, the management server 30 is connected to the image forming apparatus 10 through a network, which is not limited to a local area network (LAN) and may be the Internet, a dedicated line, or a signal line.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   a processor that performs control, in a case where a plurality of print jobs with different allowable values of a transport speed are consecutively scheduled on one roll of rolled paper, so as to increase and reduce the transport speed of each print job in such a range that the transport speed of the print job does not exceed the allowable value of the transport speed of the print job during execution of print operation corresponding to the print job.

2. The information processing system according to claim 1,
   wherein the processor controls a maximum value of the transport speed during execution of print operation corresponding to each print job so as to be closer to the allowable value determined for the print job.

3. The information processing system according to claim 1,
   wherein the processor performs control so as to increase and reduce the transport speed so as to maximize the transport speed in such a range that the transport speed does not exceed the corresponding allowable value.

4. The information processing system according to claim 1,
   wherein the processor performs control so as to increase and reduce the transport speed in a period corresponding to each print job in accordance with a magnitude relationship between respective allowable values corresponding to two print jobs scheduled to be consecutive.

5. The information processing system according to claim 4,
   wherein, in a case where a first allowable value corresponding to a print job being executed is smaller than a second allowable value corresponding to a print job to be executed next, the processor increases the transport speed such that the transport speed corresponding to the print job being executed reaches the first allowable value.

6. The information processing system according to claim 4,
   wherein, in a case where a first allowable value corresponding to a print job being executed is larger than a second allowable value corresponding to a print job to be executed next, the processor reduces the transport speed corresponding to the print job being executed to the second allowable value before start of the next print job.

7. The information processing system according to claim 1,
   wherein the plurality of print jobs are scheduled to be executed in an order of a magnitude of the respective allowable values corresponding to the plurality of print jobs.

8. The information processing system according to claim 7,
   wherein the plurality of print jobs are scheduled to be executed in an ascending order of the magnitude of the respective allowable values corresponding to the plurality of print jobs.

9. The information processing system according to claim 1,
   wherein the processor performs control so as to increase and reduce the transport speed upon receiving a selection of an operation mode that allows performing control so as to increase and reduce the transport speed.

10. The information processing system according to claim 9,
    wherein, upon receiving an instruction to rearrange the print jobs to be executed in an order of a magnitude of the respective allowable values corresponding to the plurality of print jobs, the processor performs control so as to increase and reduce the transport speed on a basis of the allowable values corresponding to the print jobs after being rearranged.

11. A non-transitory computer readable medium storing a program causing a computer to execute a process comprising:
    performing control, in a case where a plurality of print jobs with different allowable values of a transport speed are consecutively scheduled on one roll of rolled paper, so as to increase and reduce the transport speed of each print job in such a range that the transport speed of the print job does not exceed the allowable value of the transport speed of the print job during execution of print operation corresponding to the print job.

12. An information processing system comprising:

means for performing control, in a case where a plurality of print jobs with different allowable values of a transport speed are consecutively scheduled on one roll of rolled paper, so as to increase and reduce the transport speed of each print job in such a range that the transport speed of the print job does not exceed the allowable value of the transport speed of the print job during execution of print operation corresponding to the print job.

* * * * *